United States Patent Office 3,505,387
Patented Apr. 7, 1970

3,505,387
ESTERS AND PROCESS
Philip F. Beal III, Kalamazoo, Frank H. Lincoln, Jr., Portage, and John C. Babcock, Kalamazoo, Mich., assignors to The Upjohn Company, Kalamazoo, Mich., a corporation of Delaware
No Drawing. Filed Apr. 11, 1966, Ser. No. 541,477
Int. Cl. C07c 69/74
U.S. Cl. 260—468                                    11 Claims This invention relates to compounds related to prostaglandins and having prostaglandin-like activity, and to intermediates used in the manufacture of these compounds. This invention also relates to a process for the manufacture of dihydroprostaglandin $E_1$ (dihydro $PGE_1$) and related compounds.

The term prostaglandin is used broadly to designate a material, having hypotensive and smooth muscle-stimulating activity, obtainable from accessory genital glands, seminal fluid, and the like. Prostaglandins have been found to be present in the kidney and lung of both male and female animals and in the seminal vesicles of the male. A crude material, designated prostaglandin, was obtained by Von Euler from extracts of such materials [Arch. Exp. Path. Pharmak. 175, 78 (1934), 181 (1936), J. Physiol. 72, 74 (1931), 81, 102 (1934), 84, 21 (1935), 88, 213 (1936), Klin. Wschr. 14, 118L (1935)]. Recently [Acta Chemica Scandinavia 14, 1693–1704 (1960)] two distinct compounds designated PGE (now known as $PGE_1$) and PGF (now known as $PGF_{1\alpha}$) have been isolated from crude materials such as Von Euler prostaglandin.

$PGE_1$ contains an unsaturated, non-aromatic hydroxycarboxylic acid side chain. $PGE_1$ can be selectively hydrogenated by the usual methods for saturating ethenoid double bonds, for example, hydrogenation in a solvent such as ethanol or acetic acid in the presence of rhodium, Raney nickel, platinum, palladium or like hydrogenation catalyst to give dihydro $PGE_1$ which also exhibits prostaglandin-like activity.

The structure of $PGE_1$ is as follows:

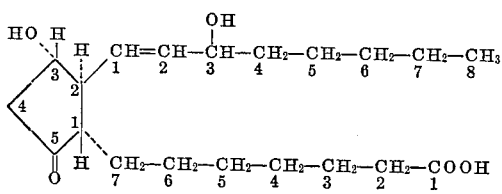

and is named systematically (using the numbering shown) as: 7-[3α-hydroxy-5-oxo-2β-(3-hydroxy-1-octenyl)cyclopent-1α-yl]heptanoic acid.

The broken line attachments shown in the above formula and in the formulas below indicate that these substituents are in the α-configuration, i.e., are below the plane of the cyclopentane nucleus. The wavy line attachment (⌇) in the formulas below indicate that these substituents are in the α-configuration, i.e., below the plane of the cyclopentane nucleus, or the β-configuration, i.e., above the plane of the cyclopentane nucleus.

The dihydroPGE₁ series of compounds is characterized by the presence of an oxo group in the 5-position and an hydroxyl group in the 3-position of the cyclopentane ring. In addition, compounds isomeric with the 3-hydroxy-5-oxo compounds are those in which the oxo group is in the 3-position and the hydroxyl group is in the 5-position.

The novel compounds of the dihydroPGE₁ series and compounds isomeric therewith of this invention are represented by the following formulas:

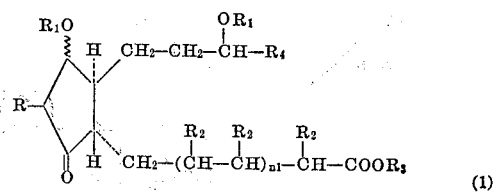

(1)

and

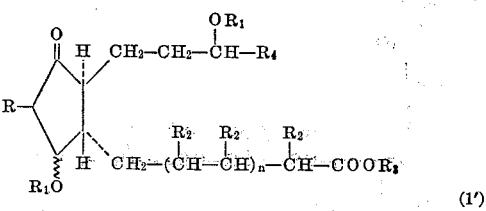

(1')

wherein

R is selected from the group consisting of hydrogen and methyl,
$R_1$ is selected from the group consisting of hydrogen and the acyl radical of a hydrocarbon carboxylic acid containing 1 to 12 carbon atoms, inclusive,
$R_2$ is selected from the group consisting of hydrogen and methyl, with the proviso that not more than one $R_2$ can be methyl in a given side chain,
$R_3$ is selected from the group consisting of hydrogen and an alkyl radical containing from 1 to 12 carbon atoms, inclusive,
$R_4$ is an alkyl radical containing 1 to 8 carbon atoms, inclusive,
$n$ is an integer selected from the group consisting of 0, 1 and 2,
and $n_1$ is an integer selected from the group consisting of 0 and 1.

The following reaction scheme illustratively represents the novel processes and novel intermediates used in the production of the novel compounds of Formulas 1 and 1':

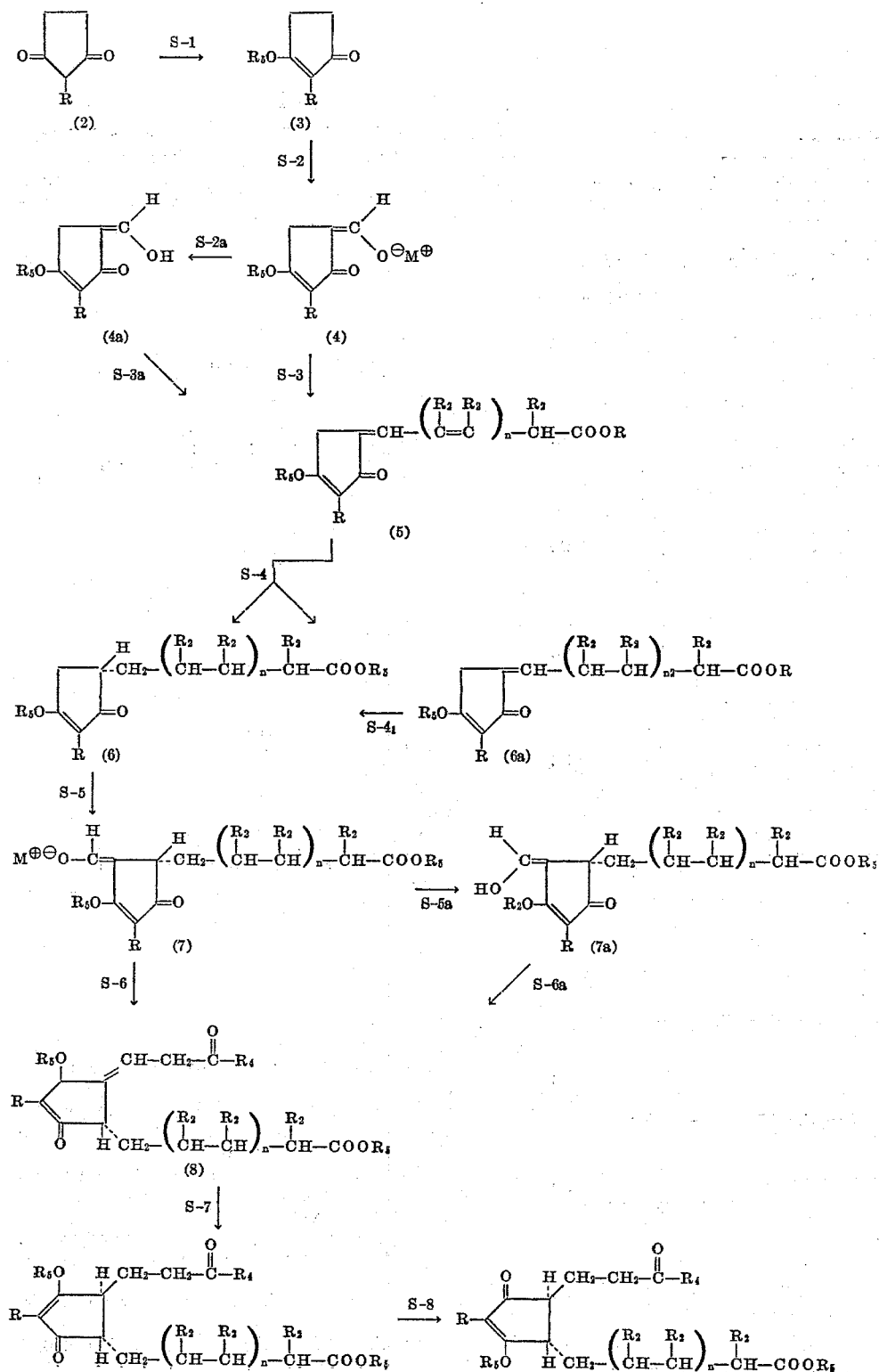

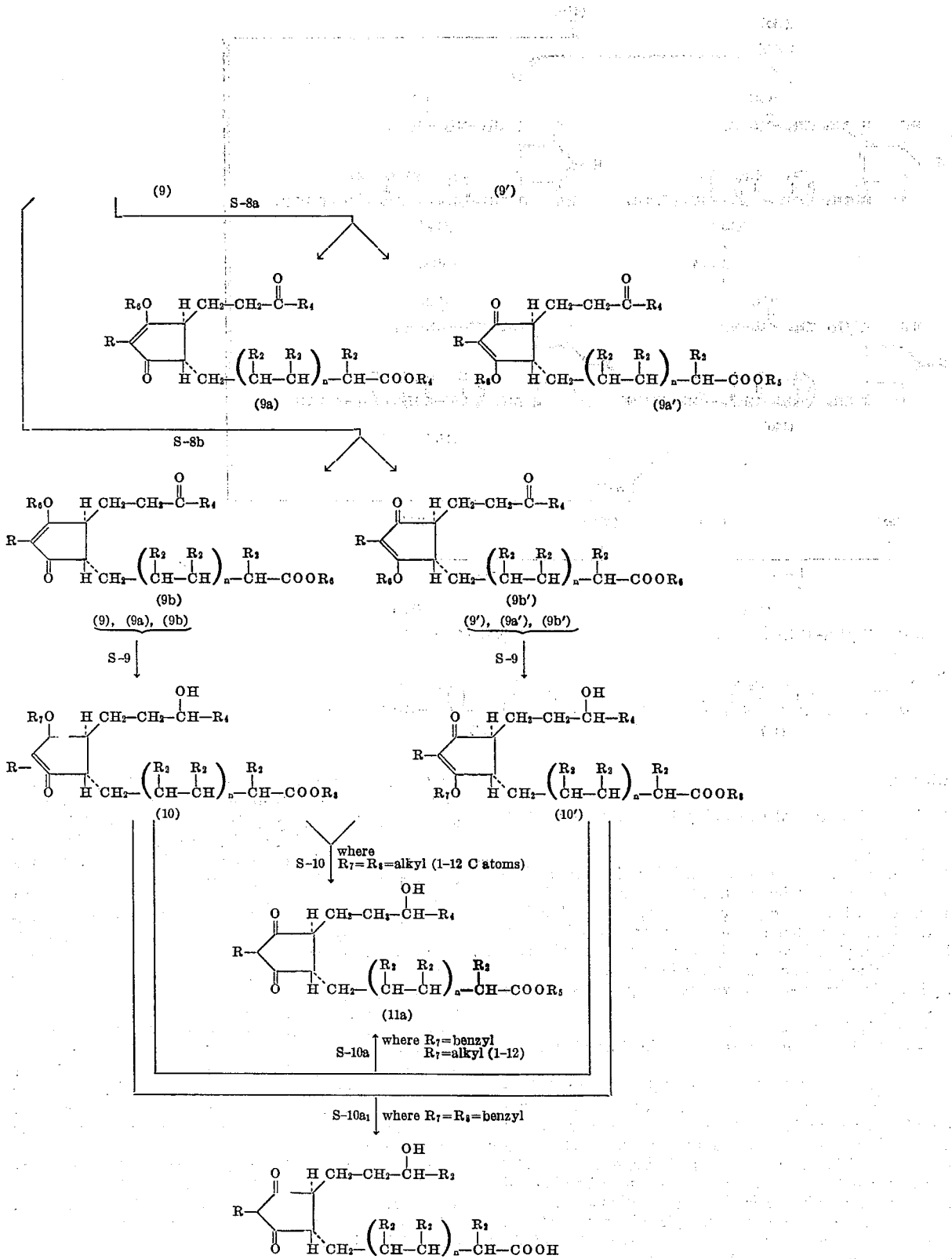

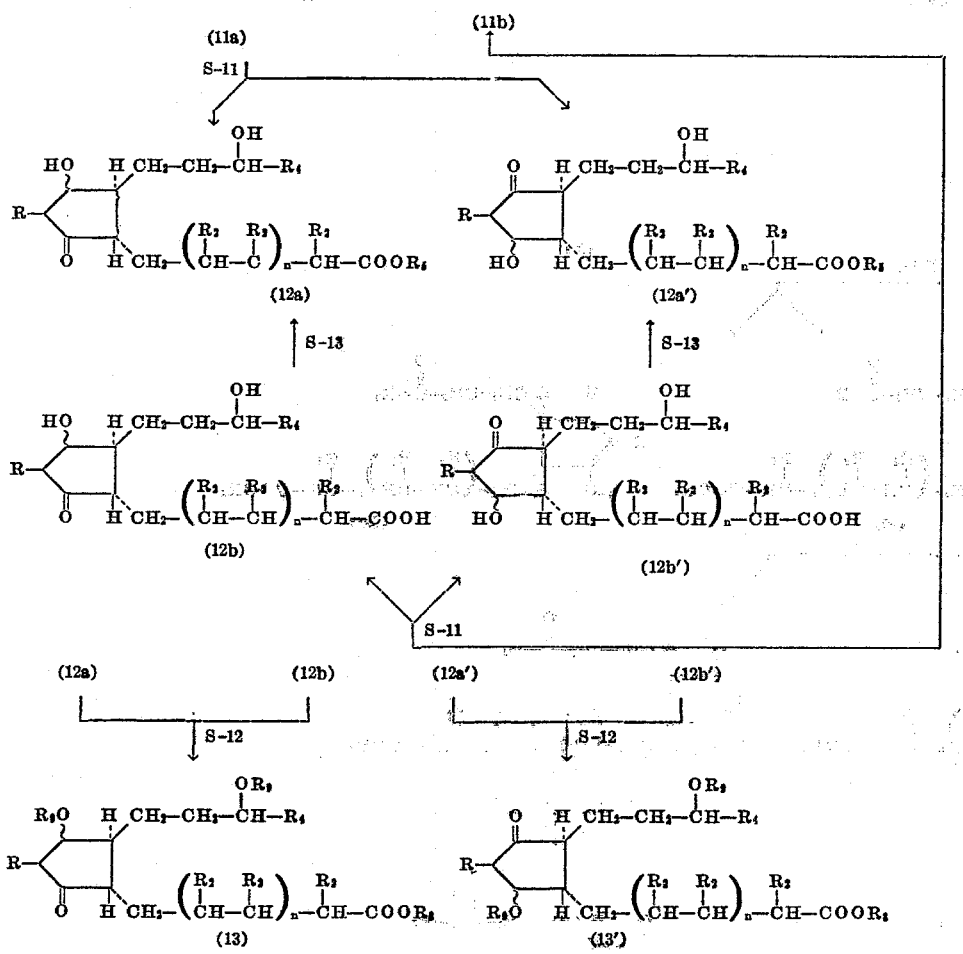

wherein $R_5$ is an alkyl radical containing 1 to 12 carbon atoms, inclusive, $R_6$ is benzyl, $R_7$ is selected from the group consisting of benzyl and an alkyl radical containing 1 to 12 carbon atoms, inclusive, $R_8$ is selected from the group consisting of benzyl and an alkyl radical containing 1 to 12 carbon atoms, inclusive, $R_9$ is the acyl radical of a hydrocarbon carboxylic acid containing 1 to 12 carbon atoms, inclusive, $n_2$ is an integer selected from the group consisting of 1 and 2, M is an alkali metal, and R, $R_1$, $R_2$, $R_3$, $R_4$, $n$ and $n_1$ are defined as above.

In the process of this invention all the compounds having one or more asymmetric carbon atoms can be produced as racemic mixtures. Those racemic mixtures which are obtained can be resolved at appropriate stages by methods well known in the art, and discussed more fully below, whereupon subsequent products may be obtained as the corresponding optically pure enantiometers.

It is to be understood that the pictorial representation of the compounds embraced by Formulas 1(12a), (12b) and (13) and 1'(12a'), (12b'), and (13'), 6, 6a, 7, 7a, 8, and the compounds designated (6'), (6a'), (7'), (7a') and (8') below, (9), (9'), (9a), (9a'), (9b), (9b'), (10), (10'), (11a) and (11b) is to be construed as inclusive of other forms including enantiometers and racemates; and not to be construed as limited to the particular form shown.

The compounds embraced by Formulas 1(12a), (12b) and (13), 1'(12a'), (12b') and (13'), 8 and the compounds designated (8') below (9), (9'), (9a), (9a'), (9b), (9b'), (10), (10'), (11a) and (11b) exhibit hypotensive and smooth muscle stimulating activity. The hypotensive activity of these compounds makes them useful in the control of hypertension in birds and mammals, including humans and valuable domestic animals, and in laboratory animals such as mice, rats and rabbits.

The compounds embraced by Formulas 1(12a), (12b) and (13), 1'(12a'), (12b') and (13'), 8 and the compounds designated (8') below, (9), (9'), (9a'), (9b), (9b'), (10), (10'), (11a) and (11b) also possess activity as fertility controlling agents, central nervous system regulatory agents, salt- and water-retention regulatory agents, fat metabolic regulatory agents and as serum cholesterol-lowering agents which latter activity makes said compounds useful in the prevention of the onset of atherosclerosis and also in the treatment thereof in birds and mammals, including humans and valuable domestic animals. The activity of said compounds as fat metabolic regulatory agents makes them useful in the control of obesity.

The compounds embraced by Formulas 1(12a), (12b) and (13a), 1'(12a'), (12b'), (13'), 8 and the compounds designated (8') below, (9), (9'), (9a), (9a'), (9b), (9b'), (10), (10'), (11a) and (11b) also possess antimicrobial activity.

The compounds embraced by Formulas 1(12a), (12b) and (13a), 1'(12a'), (12b') and (13'), 8 and the compounds designated (8') below, (9), (9'), (9a), (9a'), (9b), (9b'), (10), (10'), (11a) and (11b) are administered by intravenous infusion of isotonic saline solutions at the rate of 0.01 to about 10, preferably about 0.1 to about 1.0 micrograms per kilogram of animal weight per minute. They may also be administered buccally, intramuscularly or by rectal suppository.

The compounds embraced by Formulas 1(12a), (12b)

and (13), 1'(12a'), (12b') and (13'), 8 and the compounds designated (8') below, (9), (9'), (9a), (9a'), (9b), (9b'), (10), (10'), (11a) and (11b) produce pronounced changes in blood pressure and block the action of vasopressin on the bladder, altering fluid transport. Agents which counteract or block this action of prostaglandin are of great interest in clinical research. To assay large numbers of compounds for prostaglandin blocking activity requires a steady supply both for treatment of control animals and for coadministration to test animals with potential blockers. Thus, the compounds listed above can be substituted for $PGE_1$, a costly and rare material, in laboratory studies for detecting agents which counteract or block the action of $PGE_1$. The compounds listed above are also useful because they can be administered to laboratory animals, preferably rats, to produce a pharmacologic response similar to that produced by $PGE_1$. Animals so treated can then serve as test animals in the search for and study of compounds which are antagonists of $PGE_1$ and of the administered compounds and which, for that reason, would be useful in blocking or terminating their effects and in blocking endogenously produced prostaglandins. For these purposes, the compounds listed above are advantageously administered to the test animal by continuous intravenous infusion in sterile saline solution, at the rate of about 0.01 to about 1.0, preferably 0.1 to 1.0 micrograms per kilogram of animal weight per minute and the blocking agent under study administered before or during treatment to approximately half the animals. The response is measured in each group and compared to determine the blocking action of the test compound.

In addition, the compounds embraced by Formulas 1(12a), (12b) and (13), 1'(12a'), (12b') and (13'), 8 and the compounds designated (8') below, (9), (9'), (9a), (9a'), (9b), (9b'), (10), (10'), (11a) and (11b) have a surprising and unexpected influence on animal cell growth in that they inhibit the usual tendency toward cell differentiation during growth. For example addition of small amounts of the compounds of the formulas listed above to isolated growing segments of chicken skin in a nutrient medium inhibits the formation of feather follicles. Because of that activity, the compounds are useful in experimental medicine, for example in studies of wound healing and of other medical problems involving control of cell differentiation during embryological and subsequent animal growth.

Until recently prostaglandins have been available only in milligram amounts after extraction from semen or seminal vesicle tissue. Recently a biosynthetic procedure has been developed for manufacture of prostaglandins from certain essential fatty acids. This procedure has greatly improved the availability of prostaglandin supplies and has permitted limited screening for prostaglandin-blocking agents. The biosynthetic process is, however, complex, as seminal vesicles from non-castrated rams or bulls are required, essential fatty acids are needed for substrate, and a mixture of products is often encountered, purification of which is difficult and tedious. The cost of producing prostaglandins by this method in sufficient amount to satisfy current needs is so high as to be a limiting factor in research. Thus, in addition to the purposes of this invention stated above, e.g., the control of hypertension, fertility control, fat metabolism regulation, etc., by the compounds embraced by Formulas 1(12a), (12b) and (13), 1'(12a'), (12b') and (13'), 8 and the compounds designated (8') below, (9), (9a), (9a'), (9b), (9b'), (10), (10'), (11a) and (11b), it is also a purpose of this invention to provide prostaglandins and prostaglandin-like materials to substitute for natural prostaglandins in the prostaglandin antagonist assays. It is still another purpose of this invention to provide a synthetic method for preparing prostaglandins and prostaglandin-like materials in substantial amount and in good purity to provide standard materials for use in prostaglandin antagonist assays. It is a further purpose to prepare sufficient prostaglandins and prostaglandin-like materials to permit a large scale screening of large numbers of compounds in sufficient numbers of animals to obtain statistically significant biological data in prostaglandin antagonist assays.

The process of this invention comprises the following:

The compounds of Formula 2, e.g., cyclopentane-1,3-dione are treated with a lower alkanol, either straight or branched-chain, containing 1 to 8 carbon atoms, inclusive, e.g., methanol, ethanol, propanol, isopropanol, butanol, tert.-butanol, hexanol, octanol, and the like, to obtain the compounds of Formula 3, e.g., 3-ethoxy-2-cyclopenten-1-one. This reaction, Reaction S-1, is carried out in the presence of an acid catalyst, e.g., p-toluenesulfonic acid, sulfuric acid, hydrochloric acid, benzenesulfonic acid, and Lewis acids, such as boron trifluoride, and the like, preferably p-toluenesulfonic acid, and at a temperature of from 20° C. to the reflux temperature of the reaction mixture with reflux temperature being preferred. Reaction S-1 can be carried out with the lower alkanol functioning as both solvent and reactant. However, it is preferred to add a reaction inert water-immiscible solvent, e.g., benzene, toluene, carbon tetrachloride and the like, preferably benzene. The compounds of Formula 3 produced by Reaction S-1 are recovered from the reaction mixture, after neutralization of the catalyst, and purified by conventional methods, such as, for example, dilution of the reaction mixture with water, extraction with a water-immiscible solvent, such as, methylene chloride, ethyl acetate, benzene, cyclohexane, ether, toluene, and the like, removal of any unchanged starting material by washing with alkali, chromatography [using Florisil (synthetic magnesium silicate) or silica gel], thin layer chromatography, distillation, or a combination of these.

Alternatively the compounds of Formula 3 can be used in the next reaction in a semi-pure state, thus avoiding the necessity of submitting the reaction mixture of S-1 to vigorous purification procedures.

The compounds of Formula 3, e.g., 3-ethoxy-2-cyclopenten-1-one, are then treated with a lower alkyl formate in the presence of a reaction inert solvent, e.g., absolute ether, chloroform, dioxane, cyclohexane, tert.-butanol, dimethylsulfoxide, and the like, preferably absolute ether, containing if desired a small amount of a lower alkanol, e.g., ethanol, and a strong alkali metal base, e.g., sodium hydride, potassium hydride, calcium hydride, lithium hydride, sodium t-butoxide, sodium ethoxide, sodium methoxide, sodium or potassium metalate of dimethylsulfoxide, phenyllithium, sodium or potassium hydroxide, sodamide, and the like, capable of supplying an alkali metal, preferably with sodium hydride, and advantageously sodium hydride dispersed in a carrier, e.g., mineral oil. This reaction, Reaction S-2, is carried out under an inert atmosphere, preferably under a nitrogen atmosphere, at a temperature of 0° C. to 80° C., preferably at 20° C. for 1 to 60 hours, with a reaction time of 18 hours being preferred. In carrying out Reaction S-2 the alkyl group of the lower alkyl formate (and the alkyl group of the lower alkanol and alkali metal lower alkoxide, if these compounds are used) should be the same as $R_5$ of Formula 3 to avoid the obtention of a mixture of products in which $R_5$ will vary. The thus obtained compounds of Formula 4, e.g., 5-hydroxymethylene-3-ethoxy-2-cyclopenten-1-one as the sodium salt, are separated from the reaction mixture by conventional techniques, e.g., precipitation, filtration, centrifugation, extraction or a combination of these.

The compounds of Formula 5 are prepared by a modified Wittig reaction. [A detailed discussion of the Wittig reaction is given by Tripett, Quart. Rev., XVIII, No. 4, p. 406 (1963).] The compounds of Formula 4, e.g., the sodium salt of 5-hydroxymethylene-3-ethoxy-2-cyclopenten-1-one, are then treated with a triphenylphosphonium halide of Formula 14 below to obtain the compounds of Formula 5, e.g., ethyl 7-(4-ethoxy-2-oxo-3-cyclopenten-1-ylidene)-3,5-heptadienoate. This reaction, Reaction S-3, is generally carried out in an inert organic solvent, such as ether, benzene, toluene, hexane, dimethylsulfoxide, tetrahydrofuran, methylene chloride, chloroform, and the like, at temperatures between 0° C. and the reflux temperature of the reaction mixture, preferably at room temperature or below, using at least one mole of a triphenylphosphonium halide of Formula 14 per mole of the compounds of Formula 4 and preferably 1.2 to 2 moles. Reaction S-3 is carried out for a period of a few hours to several days depending on the temperature and concentration of the reaction mixture and the specific triphenylphosphonium halide of Formula 14 used, preferably under a nitrogen atmosphere. After the reaction is substantially complete the compounds of Formula 5 are recovered from the reaction mixture in a conventional manner, for example, by evaporating the solvent from the reaction mixture or by adding water and extracting with a water-immiscible solvent. The crude product can be further purified by conventional means, such as countercurrent distribution, recrystallization, chromatography, e.g., over Florisil (synthetic magnesium silicate) or silica gel, or both, or thin-layer chromatography.

The triphenylphosphonium halides of the formula:

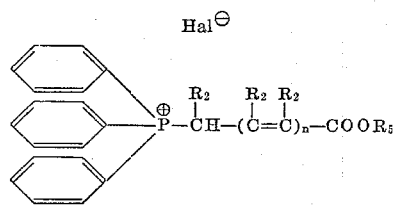

(14)

wherein Hal is bromine or chlorine and $R_2$, $R_5$ and $n$ are defined as above, are prepared by reacting a compound of the formula:

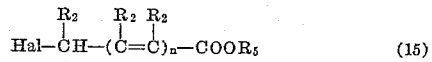

(15)

wherein $R_2$, $R_5$, Hal and $n$ are defined as above, with triphenylphosphine. If desired, the compounds of Formula 15 are reacted with triphenylphosphine in the presence of an inert organic solvent, e.g., chloroform, benzene, dioxane and the like.

Reduction of the ethylenic double bond in the compounds of Formula 5, e.g., ethyl 7-(4-ethoxy-2-oxo-3-cyclopenten - 1 - ylidene)-3,5-heptadienoate, without concomitant reduction of the enol ether is accomplished by hydrogenation using a hydrogenation catalyst, e.g., a palladium catalyst or a rhodium catalyst, preferably a rhodium on alumina or rhodium on carbon catalyst, to produce the compounds of Formula 6, e.g., ethyl 7-(4-ethoxy-2-oxo-3-cyclopenten-1-yl)heptanoate, in the presence of an inert organic solvent, e.g., methanol, ethanol, tetrahydrofuran, and the like, with methanol being preferred. The hydrogenation, Reaction S-4, is preferably carried out at room temperature and at atmospheric or above atmospheric pressure. This reaction, Reaction S-4, is stopped when the theoretical amount of hydrogen for saturation of the ethylenic double bonds has been absorbed. If desired, Reaction S-4 can be carried out in the presence or absence of an alkali metal acetate, e.g., potassium acetate, and/or acetic acid. The compounds of Formula 6 are recovered by conventional means, e.g., those set forth above for the recovery of the compounds of Formula 3.

If in hydrogenating the compounds of Formula 5, e.g., ethyl 7 - (4 - ethoxy-2-oxo-3-cyclopenten-1-ylidene)-3,5-heptadienoate, less than a theoretical amount of hydrogen is used the unsaturated side chain compounds of Formula 6a, e.g., ethyl 7-(4-ethoxy-2-oxo-3-cyclopenten-1-ylidene) heptanoate, as well as the compounds of Formula 6, e.g., ethyl 7 - (4-ethoxy-2-oxo-3-cyclopenten-1-yl)heptanoate, are obtained. The compounds of Formulas 6 and 6a can be separated from each other, and from unreacted starting material, the compounds of Formula 5, by methods known in the art, e.g., chromatography, and the compounds of Formula 6a can be subjected separately, if desired, to further hydrogenation, Reaction S-4₁, to convert them to compounds of Formula 6 according to the procedures of Reaction S-4.

The compounds of Formula 6, e.g., ethyl 7-(4-ethoxy-2-oxo-3-cyclopenten-1-yl)heptanoate, are then converted to the compounds of Formula 7, e.g., the sodium salt of ethyl 7 - [5-(hydroxymethylene)-4-ethoxy-2-oxo-3-cyclopenten-1-yl]heptanoate, Recation S-5, using the same procedures set forth above for the conversion of the compounds of Formula 3 to the compounds of Formula 4, namely, Reaction S-2.

The compounds of Formula 7, e.g., the sodium salt of ethyl 7 - [5-(hydroxymethylene)-4-ethoxy-2-oxo-3-cyclopenten-1-yl]heptanoate, are then reacted with a triphenylphosponhium halide of Formula 16 below, using a modified Wittig reaction, to obtain the compounds of Formula 8, e.g., ethyl 7-[3-ethoxy-5-oxo-2-(3-oxooctylidene)-3-cyclopenten-1-yl]heptanoate. This reaction, Reaction S-6, is carried out according to the procedures set forth above, Reaction S-3, for the conversion of the compounds of Formula 4 to the compounds of Formula 6.

The triphenylphosphonium halides of the formula:

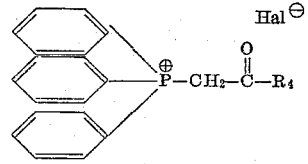

(16)

wherein $R_4$ and Hal are defined as above are prepared by reacting an acid halide of the formula:

(17)

wherein $R_4$ and Hal are defined as above with methylenetriphenylphosphorane. If desired, the compounds of Formula 17 are reacted with methylenetriphenylphosphorane in the presence of an inert organic solvent, e.g., chloroform, benzene, dioxane, and the like.

Similarly, substituting compounds of the formula

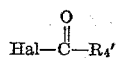

wherein Hal is defined as above and $R_4'$ is

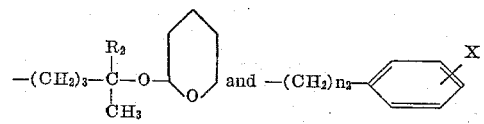

wherein $R_2$ is defined as above, $n_2$ is 1 and 2 and X is H, $CH_3$, F, Cl, and $OCH_3$, for the compounds of Formula 17 is productive of the corresponding triphenylphosphonium halide otherwise corresponding to Formula 16 and the otherwise corresponding prostaglandins of Formulas 8, 8', 9, 9', 9a, 9a' 9b, 9b', 10, 10', 11a, 11b, 12a 12a' 12b, and 12b', which exhibit useful prostaglandin-like properties.

The compounds of Formulas 5 and 8 can also be prepared by the alternate route as set forth in the reaction scheme above and described in detail immediately below.

The compounds of Formula 4, e.g., the sodium salt of 5 - hydroxy-methylene-3-ethoxy-2-cyclopenten-1-one, and Formula 7, e.g., the sodium salt of ethyl 7-(5-hydroxymethylene-4-ethoxy - 2 - oxo-3-cyclopenten-1-yl)heptanoate, are, of course, in equilibrium with the compounds of Formula 4a, e.g., 5-hydroxymethylene-3-ethoxy-2-cyclopenten-1-one, and Formula 7a, e.g., ethyl 7-(5-hydroxymethylene-4-ethoxy-2-oxo - 3-cyclopenten-1-yl)heptanoate, as well as the free aldehyde forms thereof, respectively. The position of equilibrium is determined by the pH and the dielectric constant of the solution and is altered by changing them. The free enols of Formulas 4a and 7a can be obtained by treating the compounds of Formulas 4 and 7 with an acid, while simultaneously extracting the liberated free enol into a water immiscible solvent, e.g., ether, thus avoiding the hydrolysis of the enol ether, Reactions S–2a and S–5a. Suitable acids for these reactions are inorganic acids, e.g., hydrochloric acid, sulfuric acid, phosphoric acid, and the like, and organic acids, e.g., acetic acid, formic acid, propionic acids, and the like. The free enols of Formulas 4a and 7a are then isolated by removal of the solvent.

The compounds of Formulas 4a and 7a can be converted to the compounds of Formulas 5 and 8, respectively, by the Wittig reaction. (See the discussion by Tripett referred to above.)

The compounds of Formula 4a are reacted with Wittig reagents represented, for example, by the following formula (other phosphorus derivatives known to afford Wittig reagents, such as the diethyl phosphonates, can also be used):

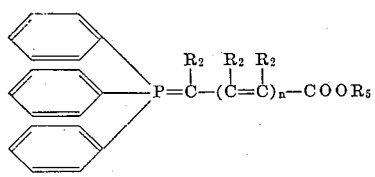

(18)

wherein $R_2$, $R_5$ and $n$ are defined as above. The Wittig reagents of Formula 18 are prepared by reacting a compound of Formula 15 with triphenylphosphine to obtain the triphenylphosphonium halides of Formula 14. The triphenylphosphonium halides of Formula 14 are treated with a base such as sodamide, or sodium or potassium hydride, the sodium or potassium metalate of dimethylsulfoxide, phenyl lithium, sodium or potassium hydroxide, and the like, to obtain the Wittig reagents of Formula 18. At least one mole of Wittig reagent is used per mole of the compounds of Formula 4a, and preferably from 2 to 10 moles of Wittig reagent is used. This reaction, Reaction S–3a, is generally carried out according to the procedures set forth above for the conversion of the compounds of Formula 4 to the compounds of Formula 5, Reaction S–3.

The compounds of Formula 7a are reacted with Wittig reagents represented, for example, by the following formula (other phosphorus derivatives known to afford Wittig reagents, such as the diethyl phosphonates, can also be used):

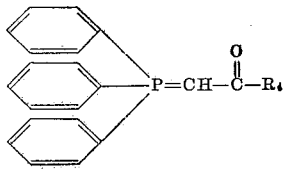

(19)

wherein $R_4$ is defined as above. The Wittig reagents of Formula 19 are prepared by reacting an acid halide of Formula 17 with methylenetriphenyl phosphorane to obtain the triphenylphosphonium halide of Formula 16. The triphenylphosphonium halides of Formula 16 are treated with a base such as sodamide, or sodium or potassium hydride, the sodium or potassium metalate of dimethylsulfoxide, phenyl lithium, sodium or potassium hydroxide, and the like to obtain the Wittig reagent is used per mole of the compounds of Formula 7a, and preferably from 2 to 10 moles of Wittig reagent is used. This reaction, Reaction S–6a, is generally carried out according to the procedures set forth above for the conversion of the compounds of Formula 4 to the compounds of Formula 5, Reaction S–3.

The compounds of Formula 8, e.g., ethyl 7-[3-ethoxy-5-oxo - 2 (3-oxooctylidene)-3-cyclopenten-1-yl]heptanoate, then hydrogenated, Reaction S–7, to obtain the compounds of Formula 9, e.g., ethyl 7 - [3-ethoxy-5-oxo-2-(3-oxooctyl - 3 - cyclopenten-1-yl]heptanoate. Reaction S–7 is carried out according to the procedures set out above, Reaction S–4, for the conversion of the compounds of Formula 5 to the compounds of Formula 6.

The compounds of Formula 9, are then treated with an acid, e.g., p-toluenesulfonic acid, sulfuric acid, hydrochloric acid, benzenesulfonic acid, and Lewis acids, such as boron trifluoride, and the like, in the presence of an alkanol of the formula $R_5OH$, wherein $R_5$ is defined as above, to give a mixture comprising the compounds of Formulas 9 and 9', Reaction S–8. Thus, for example, treating ethyl 7 - [3 - ethoxy - 5 - oxo - 2 - (3-oxooctyl) - 3 - cyclopenten - 1 - yl] heptanoate (9) with p-toluenesulfonic acid in the presence of ethanol is productive of a mixture comprising the starting material and ethyl 7-[5-ethoxy-5-oxo-2-(3-oxooctyl)-4-cyclopenten-1-yl]heptanoate (9'). Reaction S–8 is carried out at a temperature of 15° C. to 60° C. for 1 to 72 hours, preferably at about 25° C. for 16 hours. If desired, the compounds of Formulas 9 and 9' obtained in Reaction S–8 can be purified and separated by conventional means, e.g., those given above for the purification of the compounds of Formula 3.

The compounds of Formula 9 can also be treated with an acid, e.g., p-toluenesulfonic acid, sulfuric acid, hydrochloric acid, benzenesulfonic acid, and Lewis acids, such as boron trifluoride, and the like, in the presence of benzyl alcohol and at a temperature of 15° C. to 60° C., preferably at 25° C., for 1 to 72 hours, preferably 16 hours, to obtain the compounds of Formulas 9a and 9a', Reaction S–8a. Thus, for example, treating ethyl 7-[3-ethoxy-5-oxo - 2 - (3-oxooctyl)-3-cyclopenten-1-yl]heptanoate (9) with p-toluenesulfonic acid in the presence of benzyl alcohol according to the conditions of Reaction S–8a is productive of a mixture comprising ethyl 7 - [3-benzyloxy - 5 - oxo-2-(3-oxooctyl) - 3-cyclopenten-1-yl]heptanoate (9a) and ethyl 7-[5 - benzyloxy-3-oxo-2-(3-oxooctyl)-4-cyclopenten-1-yl]heptanoate (9a'). If desired the compounds of Formulas 9a and 9a' obtained in Reaction 8a can be purified and separated by conventional means, e.g., those given above for the purification of the compounds of Formula 3.

The compounds of Formula 9 can also be treated with an acid, e.g., p-toluenesulfonic acid, sulfuric acid, hydrochloric acid, benzenesulfonic acid, and Lewis acids, e.g., boron trifluoride, and the like, in the presence of benzyl alcohol and at a temperature of 60° C. to 120° C., preferably at 80° C., for 6 to 48 hours, preferably 24 hours, to obtain the compounds of Formulas 9b and 9b', Reaction S–8b. Thus, for example, treating ethyl 7 - [3-ethoxy-5-oxo - 2 - (3-oxooctyl)-3-cyclopenten-1-yl]heptanoate (9) with p-toluenesulfonic acid in the presence of benzyl alcohol according to the conditions of Reaction S–8b is productive of a mixture comprising benzyl 7 - [3-benzyloxy-5-oxo-2-(3-oxooctyl)-3-cyclopenten - 1 - yl]heptanoate (9b) and benzyl 7 - [5-benzyloxy-3-oxo-2-(3-oxooctyl)-4-cyclopenten-1-yl]heptanoate (9b'). If desired the compounds of Formulas 9b and 9b' obtained in Reaction 8b can be purified and separated by conventional means, e.g., those given above for the purificaton of the compounds of Formula 3.

The compounds of Formulas 8, 6 and 6a can also be treated with an acid in the presence of an alkanol having the formula $R_5OH$ according to procedures described above for Reaction S–8 to obtain a mixture comprising the starting material and the isomers thereof, hereinafter designated the compounds of (8'), (6') and (6a'). Thus, for example, treating ethyl 7-[3-ethoxy-5-oxo-2-(3-oxo-octylidene) - 3 - cyclopenten-1-yl]heptanoate (8), ethyl 7 - (4 - ethoxy-2-oxo-3-cyclopenten-1-yl)heptanoate (6), and ethyl 7 - (4 - ethoxy-2-oxo-3-cyclopenten-1-ylidene) heptanoate (6a), is productive of mixtures which comprises the original starting material and the corresponding isomer thereof, for example, ethyl 7-[5-ethoxy-3-oxo-2-(3 - oxooctylidene) - 4 - cyclopenten-1-yl]heptanoate (8'), ethyl 7-(2-ethoxy - 4 - oxo-2-cyclopenten-1-yl)heptanoate (6') and ethyl 7-(2-ethoxy-4-oxo-2-cyclopenten-1-ylidene) heptanoate (6a'). If desired the compounds of Formula 8 and the compounds designated (8'), the compounds of Formula 6 and the compounds designated (6'), and the compounds of Formula 6a and the compounds designated (6a'), can be purified and separated by conventional means, e.g., those given above for the purification of the compounds of Formula 3.

When the compounds of Formulas 6, 6a, 8 and 9 are isomerized with acid in an aqueous solvent mixture, hydrolysis of the enol ether can take place. The products on alkylation give the corresponding mixtures of isomers, 6 and 6', 6a and 6a', 8 and 8', 9 and 9'.

It is to be understood that the compounds of Formulas 6, 6a, 8, 9, 9a and 9b, as well as their corresponding isomers, i.e., the corresponding primed compounds, can be used as separate entities in subsequent reactions. It is also to be understood that mixtures of the compounds of Formulas 6, 6a, 8, 9, 9a and 9b with their corresponding isomers, the corresponding primed compounds, can also be used in subsequent reactions because of their ultimate conversion to the compounds of Formulas 11a and 11b below.

The compounds of Formulas 9, 9a and 9b, and 9', 9a' and 9b' are then treated with a reducing agent, e.g., lithium tri-tert.-butoxyaluminum hydride, lithium aluminumtrimethoxy hydride, sodium borohydride, potassium borohydride, diborane, and the like, to produce the compounds of Formulas 10 and 10'. This reaction, Reaction S–9, is conducted in an inert organic solvent, e.g., methanol, ethanol, tert.-butanol, tetrahydrofuran, dioxane, and the like, for sodium or potassium borohydride and tetrahydrofuran, dioxane, and the like for lithium tri-tert.-butoxyaluminum hydride, preferably at about room temperature for a period of several hours and with a slight excess of reducing agent. The product is recovered in a conventional manner, for example, by first destroying the excess reducing agent, usually by adding a dilute organic acid, (e.g., dilute acetic or formic acid), then promptly extracting with a water immiscible solvent. The product can be purified by chromatography, e.g., over Florisil or silica gel. Thus, for example, ethyl 7-[3-ethoxy-5-oxo-2-(3-oxooctyl)-3-cyclopenten-1-yl]heptanoate (9) and ethyl 7-[5-ethoxy-3-oxo-2(3-oxooctyl) - 4 - cyclopenten-1-yl] heptanoate (9') are converted to ethyl 7-[3-ethoxy-5-oxo-2-(3-hydroxyoctyl) - 3-cyclopenten-1-yl]heptanoate (10) and ethyl 7-[5-ethoxy-3-oxo-2-(3-hydroxy-octyl)-4-cyclopenten-1-yl]heptanoate (10'), respectively.

The compounds of Formulas 10 and 10', wherein $R_7=R_8=$alkyl containing 1 to 12 carbon atoms, inclusive, are then treated with a dilute aqueous solution of a strong acid, e.g., sulfuric acid, hydrochloric acid, perchloric acid, phosphoric acid, p-toluene-sulfonic acid, trifluoroacetic acid, and the like, preferably dilute sulfuric acid, while maintaining an inert atmosphere, preferably a nitrogen atmosphere, to obtain the compounds of Formula 11a. This reaction, Reaction S–10, is carried out in the presence of an inert organic solvent, e.g., tetrahydrofuran, dioxane, acetone, and the like, preferably tetrahydrofuran, at a temperature of 5° C. to 60° C. for 1 to 48 hours, depending on the concentration of acid used. The compounds of Formula 11a are generally obtained directly in relatively pure state but may be further purified if desired by conventional procedures, e.g., those set out above for the purification and recovery of the compounds of Formula 3. Thus, for example, ethyl 7-[3-ethoxy-5-oxo-2-(3-hydroxyoctyl)-3 - cyclopenten - 1-yl] heptanoate (10, $R_7=R_8=$ethyl) or ethyl 7-[5-ethoxy-3-oxo-2-(3-hydroxyoctyl)-4-cyclopenten - 1 - yl]heptanoate (10', $R_7=R_8=$ethyl), or mixtures thereof, are converted to ethyl 7 - [3,5-dioxo-2-(3-hydroxyoctyl)cyclopent-1-yl] heptanoate (11a).

The compounds of Formula 11a are also obtained by hydrogenating the compounds of Formulas 10 and 10', wherein $R_7=$benzyl and $R_8=$alkyl containing 1 to 12 carbon atoms, inclusive, until one equivalent of hydrogen is absorbed in the presence of a hydrogenation catalyst, preferably palladium on charcoal catalyst. This reaction, Reaction S–10a, is generally carried out at atmospheric pressure and 20° C., although higher and lower pressures and temperatures are operable. Thus, for example, ethyl 7 - [3-benzyloxy-5-oxo-2-(3-hydroxyoctyl)-3-cyclopenten-1-yl]heptanoate (10, $R_7=$benzyl, $R_8=$ethyl), or ethyl 7-[5-benzyloxy-3-oxo-2-(3-hydroxyoctyl) - 4 - cyclopenten-1-yl]heptanoate (10', $R_7=$benzyl, $R_8=$ethyl) or mixtures thereof, are converted to ethyl 7-[3,5-dioxo-2-(3-hydroxyoctyl)cyclopent-1-yl]heptanoate (11a).

The compounds of Formula 11b are obtained by hydrogenating the compounds of Formulas 10 and 10', wherein $R_7=R_8=$benzyl, until two equivalents of hydrogen is absorbed in the presence of a hydrogenation catalyst, preferably a palladium on charcoal catalyst. This reaction, Reaction S–10a$_1$, is carried out according to the procedures set forth above for Reaction S–10a. Thus, for example, benzyl 7-[3-benzyloxy-5-oxo-2-(3-hydroxyoctyl)-3-cyclopenten-1-yl]heptanoate (10, $R_7=R_8=$benzyl)

or benzyl 7-[5-benzyloxy-3-oxo-2-(3-hydroxyoctyl)-4-cyclopenten-1-yl]heptanoate (10', $R_7=R_8=$benzyl), or mixtures thereof, are converted to 7-[3,5-dioxo-2-(3-hydroxyoctyl)cyclopent-1-yl]heptanoic acid (11b).

The compounds of Formulas 11a and 11b are represented and named as β-dioxo compounds. However, it is to be understood that, like the compounds of Formulas 4a and 7a, they also exist in the tautomeric enolic form and it is to be further understood the compounds of Formulas 11a and 11b as represented and named above, are inclusive of their tautomeric enolic forms.

The compounds of Formulas 11a and 11b are then hydrogenated to obtain the compounds of Formulas 12a and 12a', and 12b and 12b', respectively. This reaction, Reaction S–11, is carried out in a manner similar to that described above for the conversion of the compounds of Formula 5 to the compounds of Formula 6, Reaction S–4, except that rhodium on a support, such as carbon or alumina, is preferred as the catalyst and an acetate buffer, e.g., an alkali metal acetate, such as potassium acetate, or an alkali metal acetate in acetic acid, is preferably present in the inert organic solvent. Thus, for example, ethyl 7-[3,5-dioxo-2-(3-hydroxyoctyl)cyclopent-1-yl]heptanoate (11a) is converted to ethyl 7-[3-hydroxy-5-oxo-2-(3 - hydroxyoctyl)cyclopent - 1 - yl]hepatnoate (12a) and ethyl 7-[5-hydroxy-3-oxo-2-(3-hydroxyoctyl) cyclopent-1-yl]heptanoate (12a′) and 7-[3,5-dioxo-2-(3-hydroxyoctyl)cyclopenten-1-yl]heptanoic acid (11b) is converted to 7-[3-hydroxy-5-oxo-2-(3-hydroxyoctyl)cyclopent-1-yl]heptanoic acid (12b) and 7-[5-hydroxy-3-oxo-2-(3-hydroxyoctyl)cyclopent - 1 - yl]heptanoic acid (12b′).

It has been found that occasionally the hydrogen uptake ceases before completion in Reaction S–11. Additional catalyst is then added and hydrogenation continued until the hydrogenation is completed. This step is of particular importance to this invention as it has been found that the reduction of the compounds of Formulas 11a and 11b with borohydride or aluminum hydride reducing agents does not produce the desired product. Further, the desired products, the compounds of Formulas 12a, 12a′, 12b and 12b′ are β-hydroxyketones and decompose readily under inappropriate reaction conditions.

Thus, reduction of 3-ethoxy-2-cyclopenten-1-one with sodium borohydride is known to produce 3-ethoxy-2-cyclopenten-1-ol and subsequent mild acid hydrolysis affords cyclopentenone but no 3-hydroxycyclopentanone. Similarly, reduction of 3-ethoxy-2-cyclohexenone with sodium borohydride is known to produce 3-ethoxy-2-cyclohexenol and subsequent mild acid hydrolysis affords cyclohexenone but no 3-hydroxycyclohexanone. Using the above-described conditions, we have found that 3-benzyloxy-2-cyclopenten-1-one can be hydrogenolyzed under the conditions of step 10a using a palladium catalyst and the resulting cyclopentane-1,3-dione reduced under the conditions of step 11 using a rhodium catalyst preferably in the presence of sodium acetate and acetic acid to produce 3-hydroxycyclopentanone. Similarly, 3-benzyloxy-2-cyclohexen - 1 - one affords 3-hydroxycyclopentanone.

Alternatively the compounds of Formulas 12a and 12a′ are obtained by hydrogenating the compounds of Formulas 10 ($R_7$=benzyl, $R_8$=alkyl) and 10′ ($R_7$= benzyl, $R_8$=alkyl) in the presence of the palladium catalyst, followed by further hydrogenation in the presence of the rhodium catalyst, without isolation of the compounds of Formulas 11a and 11b. Similarly the compounds of Formulas 12b and 12b′ are obtained by hydrogenating the compounds of Formulas 10 ($R_7$=$R_8$= benzyl) and 10′ ($R_7$=$R_8$=benzyl). It should be noted that when $R_7$=benzyl and $R_8$=alkyl, one equivalent of hydrogen is absorbed during the palladium hydrogenation and the products obtained are the compounds of Formulas 12a and 12a′, while when $R_7$ and $R_8$=benzyl, 2 equivalents of hydrogen are absorbed during the palladium hydrogenation and the products obtained are the compounds of Formulas 12b and 12b′.

The compounds of Formulas 12a and 12b can be acylated to yield the corresponding acylates, the compounds of Formula 13 and the compounds of Formulas 12a′ and 12b′ can be acylated to yield the corresponding acylates, the compounds of Formula 13′. The acylation, Reaction S–12, is carried out by reacting the starting material with an acid anhydride or acid chloride at a temperature of 0° C. to 60° C. for one to 30 hours, with 20° C. and 16 hours being preferred. Advantageously, the reaction can be carried out in the presence of a tertiary amine, e.g., pyridine, triethylamine, quinoline, lutidine, and the like, preferably pyridine. The products are recovered by conventional means.

The compounds of Formulas 10 and 10′ can also be acylated to obtain their corresponding acylates using the conditions described above for Reaction S–12.

The compounds of Formulas 12b, 12b′, 13 ($R_3$=hydrogen), 13′ ($R_3$=hydrogen) and 11b can be transformed to pharmacologically acceptable salts by neutralization with appropriate amounts of the corresponding inorganic or organic base. Pharmacologically acceptable cations can be the cationic form of a metal, ammonia, or an amine, or can be quaternary ammonium ions. Especially preferred metal cations are those derived from the alkali metals, e.g., lithium, sodium, and potassium, and from the alkaline earth metals, e.g., magnesium, calcium, strontium, and barium, although the cationic form of other metals, e.g., aluminum, zinc, iron, and silver, are within the scope of this invention. Pharmacologically acceptable amines can be derived from primary, secondary, or tertiary amines. Examples of suitable amines are methylamine, dimethylamine, trimethylamine, ethyl amine, dibutylamine, triisopropylamine, N-methylhexylamine, decylamine, allylamine, crotylamine, cyclopentylamine, dicyclopentylamine, ephedrine, phenylephrine, epinephrine, procaine, and the like. Examples of suitable pharmacologically acceptable quaternary ammonium cations are tetramethylammonium, tetraethylammonium, benzyltrimethylammonium, phenyltriethylammonium, and the like.

These transformations to salts can be carried out by a variety of procedures known in the art to be generally useful for the preparation of inorganic, i.e., metal or ammonium, salts, amine acid addition salts, and quaternary ammonium salts. The choice of procedure will depend in part upon the solubility characteristics of the particular salt to be prepared. In the case of the inorganic salts, it is usually suitable to dissolve the selected acid in water containing the stoichiometric amount of a hydroxide, carbonate, or bicarbonate corresponding to the inorganic salt desired. Advantageously, the reaction is carried out in the presence of an inert organic solvent, e.g., methanol, ethanol, dioxane, and the like. For example, such use of sodium hydroxide, sodium carbonate, or sodium bicarbonate gives a solution of the sodium salt. Evaporation of the water or addition of a water-miscible solvent of moderate polarity, for example, a lower alkanol or a lower alkanone gives the solid inorganic salt if that form is desired.

To produce an amine salt, the selected acid can be dissolved in a suitable solvent of either moderate or lower polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it can usually be obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the selected acid with the stoichiometric amount of the corresponding quaternary ammonium hydroxide in water solution, followed by evaporation of the water.

The compounds of Formulas 12b and 12b′ can be converted to their corresponding esters, the compounds of Formulas 12a and 12a′, respectively. This reaction, Reaction S–13, is carried out by reacting the selected acid with a diazoalkane, e.g., diazomethane, diazoethane, diazobutane, 1-diazo-2-ethylhexane, cyclohexyldiazomethane, diazododecane, and the like. Reaction S–13 is carried out in the presence of an inert organic solvent, e.g., methanol, diethyl ether, tetrahydrafuran, dioxane, chloroform, and the like, or a mixture thereof, preferably in a 10% methanol–90% diethyl ether mixture at a temperature of 0° C. to 50° C., with room temperature (25° C.) being preferred. The products are then purified by conventional means, e.g., evaporation to residue, followed by chromatography. Thus, for example 7-[3-hydroxy - 5 - oxo - 2 - (3 - hydroxyoctyl)cyclopent-1-yl] heptanoic acid (12b) is reacted with diazomethane to obtain methyl 7-[3-hydroxy-5-oxo-2-(3-hydroxyoctyl)cyclopent-1-yl]heptanoate (12a).

The racemic products and intermediates of this invention can be resolved into their optically active components by a number of methods of resolution well known in the art. Those compounds which are enols or free acids or capable of being converted to free acids, e.g., 7a, 7a′, 11b, 12b and 12b′, are treated with an optically active base, e.g., cinchonine, quinine, brucine or d- and l-α-phenylethylamine to produce diastereoisomeric salts which can be separated by crystallization. Alternatively, the acid may be esterified with an optically active alcohol, e.g., d- and l-menthol, estradiol 3-acetate, and the diastereoisomeric esters then resolved. In addition, the compounds containing free hydroxyl groups can be acylated with the acid chloride or anhydride of an optically active acid, or the free acid in the presence of an esterification catalyst, e.g., d-camphorsulfonic acid, α-bromocamphorsulfonic acid, and d- and 1-6,6′-dinitrodiphenic acid, to give diastereoisomeric esters which are resolvable by crystallization.

Resolution of the racemic prostaglandins and prostaglandin-like compounds of this invention can also be accomplished by reverse phase and absorption chromatography on an optically active support and adsorbent and by selective transformation of one isomer with a biologically-active prostaglandin transforming system, for example, the 15-dehydrogenating system present in lung such as guinea-pig, rat, and pig lung and in microorganisms such as fungi. Such transformation can be carried out by incubation or perfusion using methods well established in the art, followed by isolation and recovery of both the isomer resistant to the metabolic transformation applied, and the product formed by the enzymatic transformation.

The S-3a and S-6a reactions described above, using the Wittig reaction, have general application to compounds having the structure

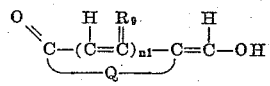

(20)

wherein $n_1$ is defined as above and $R_9$ is selected from the group consisting of hydrogen and $OR_5$, wherein $R_5$ is defined as above, and Q is an organic moiety which does not contain reactive carbonyl groups, e.g., aldehyde or hydroxymethylene groups. The compounds of Formula 20 are reacted with the Wittig reagents of Formulas 18 and 19 to obtain the compounds of Formulas 21 and 22

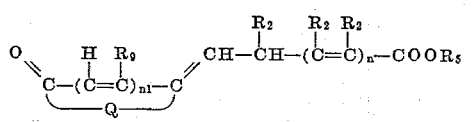

(21)

and

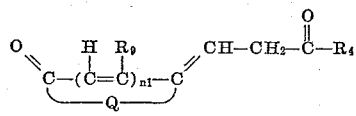

(22)

respectively, wherein $n$, $n_1$, $R_2$, $R_4$, $R_5$, $R_9$ and Q are defined as above.

The sequence of steps in the process of this invention can be rearranged, and equivalent reagents can be found besides those mentioned, without departing from the spirit of the invention. Some alternative routes have been included, but to describe all possibilities would expand this disclosure needlessly. Also, where discussion of different possible isomeric intermediates would not aid in describing the invention, such discussion has been omitted.

In a number of the examples whch follow, nuclear magnetic resonance spectroscopy (N.M.R.) has been used along with other instrumental properties, such as infra-red (I.R.) and ultraviolet (U.V.) spectroscopy and mass spectroscopy to characterize and define the products obtained. For discussions of N.M.R. spectroscopy and its application as a definitive measurement and identification of chemical compositions see Bhaca and Williams, Applications of N.M.R. Spectroscopy in Organic Chemistry, Holden Day (1964); L. M. Jackman, Applications of Nuclear Magnetic Resonance Spectroscopy in Organic Chemistry, Pergamon, London (1959); J. D. Roberts, Nuclear Magnetic Resonance, McGraw-Hill, N.Y. (1959); Wiberg and Nest, The Interpretation of N.M.R. Spectra, Benjamin, N.Y. (1962).

All N.M.R. data were obtained on the Varian N.M.R. instrument, Model A–60 (run at 60 megacycles) and reported in cycles per second (cps) downfield from the standard tetramethylsilane.

The following preparations and examples illustrate the best mode contemplated by the inventors for carrying out their invention.

PREPARATION 1

Cyclopentane-1,3-dione (2)

A solution of 100 g. of 4-cyclopentene1,3-dione in 1100 ml. of benzene and 400 ml. of absolute ethanol was hydrogenated in an automatic shaker using 0.5 g. of 5% rhodium on carbon catalyst. As the reduction proceeded an additional 1.0 g. of 5% rhodium on carbon was added. The hydrogen uptake stopped after a total of about 1 mole of hydrogen had been absorbed. The mixture containing cyclopentane-1,3-dione thus-obtained was used directly in Example 1, Part A, without further purification.

PREPARATION 2

5-carbethoxy-2,4-pentadienyltriphenylphosphonium bromide 54.5 (0.208 mole) of triphenylphosphine and 41.4 g. (0.19 mole) of ethyl 6-bromosorbate in 180 ml. of chloroform was mixed while cooling in an ice-bath. The reaction mixture was allowed to stand overnight under a nitrogen atmosphere at room temperature to yield a chloroform solution of 5-carbethoxy-2,4-pentadienyl-triphenylphosphonium bromide.

Similarly substituting methyl 4-bromocrotonate, methyl 3-methyl-4-bromocrotonate, ethyl bromoacetate, and the like for ethyl 6-bromosorbate is productive of 3-carbomethoxy - 2 - propenyltriphenylphosphonium bromide, 3 - carbomethoxy - 2 - methyl - 2 - propenyltriphenylphosphonium bromide, carbethoxymethyltriphenylphosphonium bromide, and the like, respectively.

PREPARATION 3

2-oxoheptyltriphenylphosphonium chloride

While maintaining a nitrogen atmosphere, 54 g. of methyltriphenylphosphonium bromide was suspended in 1750 ml. of absolute ether and 46 g. of 31–33% N-butyl lithium in wax was added thereto, followed by stirring for 2½ hours. The thus-obtained mixture was filtered through glass wool into a solution of 26 ml. of caproyl chloride in 800 ml. of absolute ether and stirred for one hour under a nitrogen atmosphere. The solvent was then removed under diminished pressure. 1000 ml. of chloroform was added to the residue followed by 500 ml. of cold dilute hydrochloric acid (50:50) and the mixture was stirred 10 minutes. The organic layer was separated, washed twice with water and dried over sodium sulfate, and the solvent was removed in vacuo. Commercial hexanes were added to the residue which was then stirred and decanted. This procedure was repeated two more times after which the residue was taken up in methylene chloride, poured into 700 ml. of ether and cooled to 0° C. The mixed solvent was decanted and the residual material crystallized from acetone-commercial hexanes to yield 2-oxoheptyltriphenylphosphonium chloride having a melting point of 186–188° C.

Similarly substituting acetyl chloride,
propionyl chloride,
butyryl chloride,
valeryl chloride,
benzoyl chloride,
phenylacetyl chloride,
β-phenylpropionyl chloride,
5-(2'-tetrahydropyranyloxy)-hexanoyl chloride,
5-methyl-5-(2'-tetrahydropyranyloxy)-hexanoyl chloride,
and the like for caproyl chloride is productive of
2-oxopropyltriphenylphosphonium chloride,
2-oxobutyltriphenylphosphonium chloride,
2-oxopentyltriphenylphosphonium chloride,
2-oxohexyltriphenylphosphonium chloride,
2-oxo-2-phenylethyltriphenylphosphonium chloride,
2-oxo-3-phenylpropyltriphenylphosphonium chloride,
2-oxo-4-phenylbutyltriphenylphosphonium chloride,
2-oxo-6-(2'-tetrahydropyranyloxy)heptyltriphenylphosphonium chloride,
2-oxo-6-methyl-6-(2'-tetrahydropyranyloxy)heptyltriphenylphosphonium chloride, and the like, respectively.

PREPARATION 4

5-carbethoxy-2,4-pentadienylidenetriphenylphosphorane

A mixture of 4.38 g. of ethyl 6-bromosorbate, 5.97 g. of triphenylphosphine and 25 ml. of chloroform is prepared while cooling with an ice bath and is allowed to stand in the melting ice bath for about 24 hours, then the mixture is stirred vigorously under a nitrogen atmosphere and 25 ml. of cold aqueous 5% sodium hydroxide is added. Stirring is continued for 10 minutes. A deep orange-red organic phase separates, which is washed with water, dried, and concentrated by evaporation under reduced pressure to give an oil comprising 5-carbethoxy-2,4-pentadienylidenetriphenylphosphorane.

Similarly substituting methyl 4-bromocrotonate,
methyl 3-methyl-4-bromocrotonate,
ethyl bromoacetate, and the like for ethyl 6-bromosorbate
is productive of
3-carbomethoxy-2-propenylidenetriphenylphosphorane,
3-carbomethoxy-2-methyl-2-propenylidene-triphenylphosphorane,
carbethoxymethylenetriphenylphosphorane, and the like, respectively.

PREPARATION 5

2-oxoheptylidenetriphenylphosphorane

A suspension of 4.0 g. of 2-oxoheptyltriphenylphosphonium chloride in 200 ml. of methylene chloride is mixed with 100 ml. of water and stirred until the solid dissolves. The mixture is then cooled in an ice bath and stirred under nitrogen while a solution of 0.31 g. of sodium hydroxide in 5 ml. of water is added dropwise. When addition is complete, the organic phase is separated and washed with water until the washes are neutral to a pH test paper, then the methylene chloride solution is separated and evaporated under diminished pressure to give residue comprising 2-oxoheptylidenetriphenylphosphorane.

Similarly, substituting a stoichiometrically equivalent amount of 2-oxopropyltriphenylphosphonium chloride,
2-oxobutyltriphenylphosphonim chloride,
2-oxo-2-phenylethyltriphenylphosphonium chloride, and the like, for 2-oxoheptyltriphenylphosphonium chloride is productive of
2-oxopropylidenetriphenylphosphorane,
2-oxobutylidenetriphenylphosphorane,
2-oxo-2-phenylethylidenetriphenylphosphorane, and the like, respectively.

EXAMPLE 1

Part A.—3-ethoxy-2-cyclopenten-1-one (3)

The mixture containing 102 g. of cyclopentane-1,3-dione (2), 1100 ml. of benzene and 440 ml. of ethanol, obtained according to Preparation 1, was transferred to a round-bottom flask fitted with a distillation column, water trap and a condenser, and 3.3 g. of p-toluenesulfonic acid was added thereto. The acidic mixture was heated at reflux, the aqueous azeotrope being removed from the water trap, 500 ml. being removed during a 6.5 hour period. The reaction mixture contained in the round-bottom flask was cooled and washed with five 250-ml. portions of sodium hydroxide solution saturated with sodium chloride. The organic layers from each of the 5 washings were combined and washed twice with water. Each of the aqueous washes was re-extracted with methylene chloride and combined with the originally obtained combined organic layers. Following removal of the organic solvent in vacuo, the residue containing 91.0 g. was distilled in vacuo to yield 62.0 g. of 3-ethoxy-2-cyclopenten-1-one (3) which distilled at 62° C. at 5 mm. pressure and had the following analysis:

I.R. (principal bands; methylene chloride): 1700, 1600 cm.$^{-1}$.

Following the procedure of Example 1, Part A, but substituting an alkanol containing 1 to 12 carbon atoms, inclusive, e.g., methanol, propanol, isopropanol, butanol, octanol, dodecanol and the like, for ethanol is productive of the corresponding 3-alkoxy compounds of Formula 3 e.g., 3-methoxy-2-cyclopenten-1-one,
3-propoxy-2-cyclopenten-1-one,
3-isopropoxy-2-cyclopenten-1-one,
3-butoxy-2-cyclopenten-1-one,
3-octyloxy-2-cyclopenten-1-one,
3-dodecyloxy-2-cyclopenten-1-one, and the like, respectively.

Part B.—3ethoxy-2-methyl-2-cyclopenten-1-one (3)

Following the procedure of Example 1, Part A, but substituting 2-methylcyclopentane-1,3-dione [see Panouse et al., Bull. Soc. Chim. Francais, 1036 (1955)] for cyclopentane-1,3-dione there is obtained 3-ethoxy-2-methyl-2-cyclopenten-1-one (3).

In like manner, substituting an alkanol, containing 1 to 12 carbon atoms, inclusive, e.g., methanol, propanol, isopropanol, butanol, octanol, dodecanol, and the like, for ethanol is productive of the corresponding 3-alkoxy-2-methyl compounds of Formula 3, e.g., 3-methoxy-2-methyl-2-cyclopenten-1-one,
3-propoxy-2-methyl-2-cyclopenten-1-one,
3-isopropoxy-2-methyl-2-cyclopenten-1-one,
3-butoxy-2-methyl-2-cyclopenten-1-one,
3-octyloxy-2-methyl-2-cyclopenten-1-one,
3-dodecyloxy-2-methyl-2-cyclopenten-1-one, and the like, respectively.

EXAMPLE 2

Sodium salt of 5-hydroxymethylene-3-ethoxy-
2-cyclopenten-1-one (4)

A solution of 39.8 g. of 3-ethoxy-2-cyclopenten-1-one (3) in 100 ml. of ethyl formate and 75 ml. of absolute ether was added dropwise to a mineral oil dispersion containing 7.5 g. of sodium hydride in 600 ml. of absolute ether and 1.0 ml. of ethyl alcohol, while stirring under a nitrogen atmosphere and cooling in an ice-bath. After the dropwise addition was complete, the ice-bath was removed and the reaction mixture was stirred for about 18 hours and filtered. The residue was dried in vacuo to yield 55.0 g. of the sodium salt of 5-hydroxymethylene-3-ethoxy-2-cyclopenten-1-one (4) as a light yellow powder.

Similarly substituting other 3-alkoxy and 3-alkoxy-2-methyl compounds, the compounds of Formula 3, e.g., 3-methoxy-2-cyclopenten-1-one,
3-propoxy-2-cyclopenten-1-one,
3-isopropoxy-2-cyclopenten-1-one,
3-butoxy-2-cyclopenten-1-one,
3-octyloxy-2-cyclopenten-1-one,
3-dodecyloxy-2-cyclopenten-1-one, and the like, and
3-methoxy-2-methyl-2-cyclopenten-1-one,
2-ethoxy-2-methyl-2-cyclopenten-1-one,
3-propoxy-2-methyl-2-cyclopenten-1-one,
3-isopropoxy-2-methyl-2-cyclopenten-1-one,
3-isopropoxy-2-methyl-2-cyclopenten-1-one,
3-butoxy-2-methyl-2-cyclopenten-1-one,
3-octyloxy-2-methyl-2-cyclopenten-1-one,
3-dodecyloxy-2-methyl-2-cyclopenten-1-one, and the like, respectively, the corresponding alkyl formates and alcohols for 3-ethoxy-2-cyclopenten-1-one, ethyl formate and ethanol, is productive of the compounds of Formula, e.g., the sodium salt of 5-hydroxymethylene-3-methoxy-2-cyclopenten-1-one,
the sodium salt of 5-hydroxymethylene-3-propoxy-2-cyclopenten-1-one,
the sodium salt of 5-hydroxymethylene-3-isopropoxy-2-cyclopenten-1-one,
the sodium salt of 5-hydroxymethylene-3-butoxy-2-cyclopenten-1-one,
the sodium salt of 5-hydroxymethylene-3-octyloxy-2-cyclopenten-1-one,
the sodium salt of 5-hydroxymethylene-3-dodecyloxy-2-cyclopenten-1-one, and the like, and
the sodium salt of 5-hydroxymethylene - 3-methoxy-2-methyl-2-cyclopenten-1-one,
the sodium salt of 5-hydroxymethylene-3-ethoxy-3-methyl-2-cyclopenten-1-one,
the sodium salt of 5-hydroxymethylene - 3-propoxy-2-methyl-2-cyclopenten-1-one,
the sodium salt of 5-hydroxymethylene-3-isopropoxy-2-methyl-2-cyclopenten-1-one,
the sodium salt of 5-hydroxymethylene-3-butoxy-2-methyl-2-cyclopenten-1-one,
the sodium salt of 5-hydroxymethylene - 3-octyloxy-2-methyl-2-cyclopenten-1-one,
the sodium salt of 5-hydroxymethylene-3-dodecyloxy-2-methyl-2-cyclopenten-1-one,
and the like, respectively.

Likewise, the substitution of other metal hydrides, particularly alkali metal hydrides, e.g., potassium hydride, lithium hydride, and the like, for sodium hydride, in the above reaction with the appropriate 3-alkoxy and 3-alkoxy-2-methyl compounds, the compounds of Formula 3, is productive of the corresponding metal salts, e.g., the potassium salts and the lithium salts of the 5-hydroxymethylene-3-alkoxy-2-cyclopenten-1-ones and 5-hydroxymethylene - 3-alkoxy - 2-methyl-2-cyclopenten-1-ones of Formula 4.

EXAMPLE 2A 5-hydroxymethylene-3-ethoxy-2-cyclopenten-1-one (4a)

A stirred mixture of 55.0 g. of the sodium salt of 5-hydroxymethylene - 3-ethoxy-2-cyclopenten-1-one (3) in 500 ml. of ice water is acidified with about 30 ml. of concentrated hydrochloric acid diluted to 100 ml. with ice. Stirring is continued for about 15 minutes, then the precipitate which has formed is separated by extraction with methylene chloride, washed with water, and dried under reduced pressure to yield 5-hydroxymethylene-3-ethoxy-2-cyclopenten-1-one (4a).

Similarly substituting other compounds of Formula 3 for the sodium salt of 5-hydroxymethylene - 3-ethoxy-2-cyclopenten-1-one is productive of the corresponding compounds embraced by Formula 4a depending on the starting material used.

EXAMPLE 3

Ethyl 7-(4-ethoxy-2-oxo-3-cyclopenten-1-ylidene)-
3,5-heptadienoate (5)

To a mixture of 0.19 mole of 5-carboethoxy-2,4-pentadienyltriphenylphosphonium bromide in 180 ml. of chloroform, obtained according to Preparation 2, there was added 100 ml. of chloroform and 24 g. (0.136 mole) of the sodium salt of 5-hydroxymethylene-3-ethoxy-2-cyclopenten-1-one (4) with stirring under a nitrogen atmosphere which was continued for 68 hours. Then the reaction mixture was washed with water, dried and evaporated in vacuo to a gummy residue. The gummy residue was taken up in methylene chloride and poured onto a chromatographic column containing 1 kg. of Florisil (synthetic magnesium silicate). The chromatographic column was eluted with 10% acetone–90% commercial hexanes, and the fractions collected in 1000 ml. portions. The first several fractions eluted contained crystalline triphenylphosphine. Those later fractions which, after being taken to dryness on a rotating evaporator, gave a crystalline residue were combined. The combined residue, weighing 11.0, was taken up in 400 ml. of anhydrous ether, concentrated to 100 ml. and filtered to yield 7.05 g. of ethyl 7-(4-ethoxy-2-oxo-3-cyclopenten-1-ylidene) - 3,5-heptadienoate (5) having a melting point of 81–87° C. In a similar run the same product, ethyl 7-(4-ethoxy-2-oxo-3-cyclopenten-1-ylidene) - 3,5-heptadienoate (5) was obtained, an analytical sample of which had a melting point of 84–87° C. and the following analysis:

Calcd. for $C_{16}H_{20}O_4$ (percent): C, 69.54; H, 7.30. Found (percent): C, 69.43; H, 7.32.

I.R. (principal bands; mineral oil mull): 3090, 1735, 1680, 1645, 1615, 1595, 1585, 1230, 1200, 1175, 1135, 1045, 1025, 1000 cm.$^{-1}$.

In like manner substituting 3-carbomethoxy-2-propenyltriphenylphosphonium bromide,
3-carbomethoxy-2-methyl-2-propenyltriphenylphosphonium bromide,
carbethoxymethyltriphenylphosphonium bromide, and the like, for 5-carboethoxy - 2,4-pentadienyltriphenylphosphonium bromide is productive of
methyl 5-(4-ethoxy-2-oxo-3-cyclopenten-1-ylidene)-3-pentenoate,
methyl 3-methyl-5-(4-ethoxy-2-oxo-3-cyclopenten - 1-ylidene)-3-pentenoate,
ethyl 3-(4-ethoxy-2-oxo - 3-cyclopenten-1-ylidene)propionate, and the like, respectively, the compounds of Formula 5.

Likewise substituting the salts, preferably the sodium salt, of the other 5-hydroxymethylene-3-alkoxy-2-cyclopenten-1-ones and 5-hydroxymethylene-3-alkoxy-2-methyl-2-cyclopenten-1-ones, the compounds of Formula 4, for 5-hydroxymethylene - 3 - ethoxy - 2 - cyclopenten - 1 - one, and reacting them with the appropriate triphenylphosphonium bromide, e.g., those named in Preparation 2, is productive of the compounds embraced by Formula 5.

EXAMPLE 3A

Ethyl 7-(4-ethoxy-2-oxo-3-cyclopenten-1-ylidene)-3,5-heptadienoate (5)

A solution of 2.5 g. of 5-hydroxymethylene-3-ethoxy-2-cyclopenten-1-one (4a) in 35 ml. of methylene chloride is stirred under nitrogen at 20° C. and 7.5 g. of 5-carbethoxy - 2,4 - pentadienylidenetriphenylphosphorane is added. The mixture is stirred for about 16 hours, then is concentrated under reduced pressure to give a residue which is triturated with 3–100 ml. portions of commercial hexanes and filtered to remove triphenylphosphine oxide. The filtrate is evaporated to give a residue which is dissolved in methylene chloride and poured onto a chromatographic column containing 100 g. of Florisil. The chromatographic column is eluted with 10% acetone–90% commercial hexanes and the fractions are collected in 100-ml. portions. The first fractions eluted contain crystalline triphenylphosphine. Those later fractions which, after being taken to dryness on a rotating evaporator, give a crystalline residue are combined, taken up in anhydrous ether, concentrated and filtered to yield ethyl 7-(4-ethoxy-2-oxo-3-cyclopenten-1-ylidene)-3,5-heptadienoate.

In like manner substituting 3-carbomethoxy-2-propenylidenetriphenylphosphorane,
3-carbomethoxy-2-methyl-2-propenylidenetriphenylphosphorane,
carbethoxymethylenetriphenylphosphorane, and the like, for 5-carbethoxy-2,4-pentadienylidenetriphenylphosphorane is productive of
methyl 5-(4-ethoxy-2-oxo-3-cyclopenten-1-ylidene)-3-pentenoate,
methyl 3-methyl-5-(4-ethoxy-2-oxo-3-cyclopenten-1-ylidene)-3-pentenoate,
ethyl 3-(4-ethoxy-2-oxo-3-cyclopenten-1-ylidene)propionate, and the like, respectively.

EXAMPLE 4

Ethyl 7 - (4-ethoxy-2-oxo-3-cyclopenten-1-yl)heptanoate (6) and ethyl 7-(4-ethoxy-2-oxo-3-cyclopenten-1-ylidene)heptanoate (6a)

A solution of 2.50 g. of ethyl 7-(4-ethoxy-2-oxo-3-cyclopenten-1-ylidene)-3,5-heptadienoate (5) in 50 ml. of ethanol was hydrogenated in an atmospheric pressure hydrogenator in the presence of 0.04 g. of 5% rhodium on alumina catalyst. After 3.5 hours the hydrogenation was interrupted and an additional 0.04 g. of catalyst was added. After a total uptake of 567 ml. of hydrogen (598 ml. theoretical), hydrogenation was stopped, the total time having been 6 hours. The catalyst was removed by filtration and the solvent was removed in vacuo. The residue thus obtained was taken up in methylene chloride and poured onto a chromatographic column containing about 250 g. of Florisil (synthetic magnesium silicate). The column was developed with commercial hexanes containing increasing amounts of acetone. Those fractions eluted with 10% acetone–90% commercial hexanes were, after evaporation of the solvent, combined to yield 1.53 g. of a product comprising ethyl 7-(4-ethoxy-2-oxo-3-cyclopenten-1-yl)heptanoate (6) and ethyl 7-(4-ethoxy-2-oxo-3-cyclopenten-1-ylidene)heptanoate (6a) having the following analysis:

I.R. (principal bands; mineral oil mull): 1735, 1670, 1600 cm.$^{-1}$.

The above obtained 1.530 g. of product was combined with the products of two other similar runs; and the combined product weighing 4.30 g. was taken up in 33.3% ethyl acetate–66.7% cyclohexane and poured onto a chromatographic column containing 500 g. of silica gel. The chromatographic column was eluted with 33.3% ethyl acetate–66.7% cyclohexane, the fractions being taken in 200 ml. portions. The solvent was evaporated and those residues which showed an ultraviolet maximum in ethanol near 240 mμ were combined to yield 2.377 g. of ethyl 7-(4-ethoxy-2-oxo-3-cyclopenten-1 - yl)heptanoate (6) having the following analysis:

I.R. (principal bands; methylene chloride): 1740, 1700, 1600 cm.$^{-1}$.

N.M.R.: 75 cps. (triplet, J=7), 84 cps. (triplet, J=7), 244 cps. (overlapping quartet, J=7), 310 cps. (broad singlet).

Those residues eluted later which showed infrared absorption peaks at 1660 and 1600 cm.$^{-1}$ and an ultraviolet maximum in ethanol near 260 mμ were combined to yield 1.16 g. of ethyl 7-(4-ethoxy-2-oxo-3-cyclopenten-1-ylidene)heptanoate (6a) having the following analysis:

I.R. (principal bands; mineral oil mull): 1745, 1715, 1660, 1600 cm.$^{-1}$.

N.M.R.: 74 cps. (triplet, J=7), 85 cps. (triplet, J=7), 134 cps. (triplet), 245 cps. (overlapping quartets, J=7), 312 cps. (triplet, J=2), 381 cps. (triplet of triplets, J=7, 2).

Similarly substituting methyl 5-(4-ethoxy-2-oxo-3-cyclopenten-1-ylidene)-3-pentenoate,
methyl 3-methyl-5-(4-ethoxy-2-oxo-3-cyclopenten-1-ylidene)-3-pentenoate,
ethyl 3-(4-ethoxy-2-oxo-3-cyclopenten-1-ylidene)propionate, and the like,
for ethyl 7-(4-ethoxy-2-oxo-3-cyclopenten-1-ylidene)-3,5-heptadienoate is productive of
methyl 5-(4-ethoxy-2-oxo-3-cyclopenten-1-yl)pentanoate and
methyl 5-(4-ethoxy-2-oxo-3-cyclopenten-1-ylidene)pentanoate,
methyl 3-methyl-5-(4-ethoxy-2-oxo-3-cyclopenten-1-yl)pentanoate and
methyl 3-methyl-5-(4-ethoxy-2-oxo-3-cyclopenten-1-ylidene)pentanoate, and
ethyl 3-(4-ethoxy-2-oxo-3-cyclopenten-1-yl)propionate and
ethyl 3-(4-ethoxy-2-oxo-3-cyclopenten-1-ylidene)propionate, and the like, respectively.

In like manner substituting other compounds of Formula 5 for ethyl 7-(4-ethoxy-2-oxo-3-cyclopenten-1-ylidene)-3,5-heptadienoate is productive of the corresponding compounds embraced by Formulas 6 and 6a depending on the starting material used.

EXAMPLE 4A

Ethyl 7-(4-ethoxy-2-oxo-3-cyclopenten-1-yl)heptanoate (6)

A solution of 2.50 g. of ethyl 7-(4-ethoxy-2-oxo-3-cyclopenten-1-ylidene)heptanoate (6a) in 50 ml. of ethanol is hydrogenated at room temperature at atmospheric pressure in the presence of 0.08 g. of rhodium on alumina catalyst. After about 200 ml. of hydrogen is absorbed, the hydrogenation is stopped, and the reaction mixture is filtered to remove the catalyst. The filtrate is evaporated under diminished pressure to give a residue. The residue is purified by chromatography over 250 g. of silica gel, placing the residue on the column with a small amount of methylene chloride and eluting with 100 ml. portions of 33.3% ethyl acetate–66.7% cyclohexane. The eluates are dried under diminished pressure and the residues, identified by ultraviolet absorption near 240 mμ and infrared absorption bands at 1740, 1700, and 1600 cm.$^{-1}$, are combined to yield ethyl 7-(4-ethoxy-2-oxo-3-cyclopenten-1-yl)heptanoate (5).

In like manner substituting other compounds of Formula 6a for 7-(4-ethoxy-2-oxo-3-cyclopenten-1-ylidene)heptanoate is productive of the corresponding compounds of Formula 6 depending on the starting material used.

EXAMPLE 4B

Ethyl 7-(2-ethoxy-4-oxo-2-cyclopenten-1-yl)heptanoate (6')

A solution of 1.01 g. of ethyl 7-(4-ethoxy-2-oxo-3-cyclopenten-1-yl)heptanoate (6) and 0.05 g. of p-toluenesulfonic acid in 25 ml. of absolute ethanol was stirred under nitrogen for about 16 hours at 20° C. Thin layer chromatography of a portion of the reaction mixture on a silica gel plate developed with ethyl acetate indicated the presence of two spots of nearly equal intensity the less polar of which had the same mobility as starting material (6). The reaction mixture was neutralized with saturated aqueous sodium bicarbonate solution and concentrated under vacuum to produce a residue. The residue was dissolved in methylene chloride and water. The organic solvent was separated, dried, and concentrated and the concentrated solution poured onto a chromatographic column containing 100 g. of silica gel. The column was eluted with 2:1 cyclohexaneethyl acetate, the fractions being taken in 50 ml. portions. The first fractions eluted, in this case fractions 15–22, exhibited an infrared absorption spectrum essentially identical to that of the starting material (6) and were combined to afford 0.414 g. of recovered (6). The latter fractions, in this case fractions 23–34, exhibited an infrared spectrum different from starting material. They were combined and the solvent removed giving 0.335 g. of ethyl 7-(2-ethoxy-4-oxo-2-cyclopenten-1-yl)heptanoate (6') having the following analysis:

N.M.R.: 73 cps. (triplet, J=7), 84 cps. (triplet, J=7), 244 (overlapping quartet J=7), 310 cps. (sharp singlet).

Similarly, substituting other compounds of Formula 6 such as methyl 5-(4-ethoxy-2-oxo-3-cyclopenten-1-yl)pentanoate, methyl 3-methyl-5-(4-ethoxy-2-oxo-3-cyclopenten-1-yl)pentanoate, ethyl 3-(4-ethoxy-2-oxo-3-cyclopenten-1-yl)propionate, and the like, for ethyl 7-(4-ethoxy-2-oxo-3-cyclopenten-1-yl)heptanoate is productive of methyl 5-(2-ethoxy-4-oxo-2-cyclopenten-1-yl)pentanoate, methyl 3-methyl-5-(2-ethoxy-4-oxo-2-cyclopenten-1-yl)pentanoate, ethyl 3-(2-ethoxy-4-oxo-2-cyclopenten-1-yl)propionate, and the like.

Similarly, substituting other alcohols, such as methanol, propanol, isopropanol, butanol, octanol, dodecanol and the like, for ethanol is productive of the corresponding enol ethers.

Similarly, substituting the compounds of Formula 6a for ethyl 7-(4-ethoxy-2-oxo-3-cyclopenten-1-yl)heptanoate is productive of the compounds designated (6a'), alkyl ω-(2-alkoxy-4-oxo-2-cyclopenten-1-ylidene) alkanoates, i.e., the position isomers of the compounds of Formula 6a.

Likewise, an equivalent amount of borontrifluoride etherate or of anhydrous hydrogen chloride can be substituted for p-toluenesulfonic acid in the process of Example 4a.

EXAMPLE 4C

Ethyl 3-(2-ethoxy-4-oxo-2-cyclopenten-1-ylidene) propionate (6a')

A solution of 5.7 g. of ethyl 3-(4-ethoxy-2-oxo-3-cyclopenten-1-ylidene)propionate (6a), $$\lambda_{max.}^{EtOH}\ 260\ m\mu$$

in 50 ml. of water containing 60 drops of concentrated sulfuric acid was stirred at room temperature (20°) for two hours giving a suspension which was filtered to give 4.9 g. of a solid product which was crystallized from ethyl acetate to yield 3.4 g. of ethyl 3-(2-hydroxy-4-oxo-2-cyclopenten-1-ylidene)propionate, M.P. 155–156° with decomposition, having the following analysis:

Analysis.—Calcd. for $C_{10}H_{12}O_4$ (percent): C, 61.21; H, 6.17. Found (percent): C, 61.12; H, 6.19.

I.R. (principal bannds; mineral oil mull): 2680, 2500, 1735, 1675, 1620, 1565, 1500 cm.$^{-1}$.

U.V. (ethanol): 275.5 m$\mu$ ($\epsilon$=17,900).

N.M.R.: 74 cps. (triplet, J=7); 175 cps. (doublet, J=2); 195 cps. (doublet, J=7); 249 cps. (quadruplet, J=7); 322 cps. (singlet); 373 cps. (triplet of triplets, J=2, 7) and 505 cps.

To a suspension of 0.85 g. of ethyl 3-(2-hydroxy-4-oxo)-2-cyclopenten-1-ylidene)propionate in 30 ml. of ethyl acetate was added at about 20° C. a dilute ethereal solution of diazoethane, until a yellow color persisted and a few drops of acetic acid are then added to decompose excess diazoethane. The solution was washed with saturated aqueous sodium bicarbonate, dried, and concentrated to yield ethyl 3-(2-ethoxy-4-oxo-2-cyclopenten-1-ylidene) propionate (6a').

I.R. (principal bands; chloroform solution): 1765, 1760, 1590 cm.$^{-1}$.

U.V. (ethanol): 268 m$\mu$ (shoulder 247 m$\mu$).

N.M.R.: 75 cps. (triplet, J=7); 171 cps. (doublet, J=2); 186 cps. (doublet, J=7); 247 cps. (quadruplet, J=7); 327 cps. (singlet); 365 cps. (triplet of triplets, J=2, 7).

In like manner, other enol ethers of Formula 6a can be hydrolyzed selectively to their corresponding free enols and can be re-etherified with diazoethane and other diazoalkanes such as diazomethane to produce the corresponding position isomeric enol of ethers of Formula 6a'.

EXAMPLE 4D

Ethyl 3-(2-ethoxy-4-oxo-2-cyclopenten-1-yl)propionate (6')

A solution of 1.24 g. of ethyl 3-(2-ethoxy-4-oxo-2-cyclopenten-1-ylidene)propionate (6a') in 50 ml. of ethanol was hydrogenated at atmospheric pressure in a hydrogenator in the presence of 0.06 g. of 5% rhodium on alumina catalyst until about 1 equivalent of hydrogen was absorbed. The reduction was stopped, the catalyst removed by filtration and the solvent removed in vacuo to give a residue. The residue was dissolved in methylene chloride, poured onto a chromatographic column containing 100 g. of Florisil, and eluated with 15:85 acetone-commercial hexanes.

The fractions which exhibit ultraviolet absorption at 240 m$\mu$ but not at 270 m$\mu$ are combined and, after evaporation of the solvent, afford ethyl 3-(2-ethoxy-4-oxo-2-cyclopenten-1-yl)propionate (6') having the following analysis:

I.R. (principal bands; methylene chloride solution) 1740, 1700, 1600 cm.$^{-1}$.

N.M.R.: 74 cps. (triplet, J=7); 85 cps. (triplet, J=7); 246 cps. (quartet, J=7) and 312 cps. (singlet).

Similarly, substituting other compounds of Formula 6a' for ethyl 3-(2-ethoxy-4-oxo-2-cyclopenten-1-ylidene)propionate is productive of the corresponding compounds designated 6'.

EXAMPLE 5

Sodium salt of ethyl 7-(5-hydroxymethylene-4-ethoxy-2-oxo-3-cyclopenten-1-yl)heptanoate (7)

To a solution containing 8.46 g. of ethyl 7-(4-ethoxy-2-oxo-3-cyclopenten-1-yl)heptanoate (6) in 20 ml. of ethyl formate and 200 ml. of absolute ether there was added a mineral oil dispersion containing 1.4 g. of sodium hydride and the reaction mixture was stirred under a nitrogen atmosphere for 66 hours. 200 ml. of absolute ether was then added to replace the bulk of the ether which had escaped during the 66 hour period. The ethereal mixture was filtered to give 9.20 g. of solids comprising the sodium salt of ethyl 7-(5-hydroxymethylene-4-ethoxy-2-oxo-3-cyclopenten-1-yl)heptanoate (7).

Similarly substituting methyl 5-(4-ethoxy-2-oxo-3-cyclopenten-1-yl)pentanoate,
methyl 3-methyl-5-(4-ethoxy-2-oxo-3-cyclopenten-1-yl)pentanoate,
ethyl 3 - (4 - ethoxy-2-oxo-3-cyclopenten-1-yl)propionate, and the like, for ethyl 7-(4-ethoxy-2-oxo-3-cyclopenten-1-yl)heptanoate is productive of
the sodium salt of methyl 5-(5-hydroxymethylene-4-ethoxy-2-oxo-3-cyclopenten-1-yl)pentanoate,
the sodium salt of methyl 3-methyl-5-(5-hydroxymethylene-4-ethoxy-2-oxo-3-cyclopenten-1-yl)pentanoate,
the sodium salt of ethyl 3-(5-hydroxymethylene-4-ethoxy-2-oxo-3-cyclopenten-1-yl)propionate, and the like, respectively.

In like manner substituting other compounds of Formula 6 for ethyl 7-(4-ethoxy-2-oxo-3-cyclopenten-1-yl)heptanoate is productive of the corresponding compounds embraced by Formula (7) depending on the starting material used.

Likewise, the substitution of other metal hydrides, particularly alkali metal hydrides, e.g., potassium hydride and lithium hydride for sodium hydrides, in the above reaction with the compounds of Formula 6 is productive of the corresponding metal salts, e.g., the potassium salts and the lithium salts of the compounds of Formula 7.

EXAMPLE 5A

Sodium salt of ethyl 7-(5-hydroxymethylene-2-ethoxy-4-oxo-2-cyclopenten-1-yl)heptanoate (7')

To a solution of 2.82 g. of ethyl 7-(2-ethoxy-4-oxo-2-cyclophenten-1-yl)heptanoate (6') in 4.0 ml. of ethyl formate and 150 ml. of n-pentane there was added a mineral oil dispersion containing 0.26 g. of sodium hydride and the reaction mixture was stirred under a nitrogen atmosphere at 10°–25° C. for 66 hours. The reaction mixture was then filtered to yield 2.65 g. of solids comprising the sodium salt of ethyl 7-(5-hydroxymethylene-2-ethoxy-4-oxo-2-cyclopenten-1-yl)heptanoate (7').

Similarly, substituting methyl 5-(2-ethoxy-4-oxo-2-cyclopenten-1-yl)pentanoate,
methyl 3-methyl-5-(2-ethoxy-4-oxo-2-cyclopenten-1-yl)pentanoate,
ethyl 3 - ( 2 - ethoxy - 4 - oxo - 2 - cyclopenten - 1 - yl) propionate, and the like for ethyl 7-(2-ethoxy-4-oxo-2-cyclopenten-1-yl)heptanoate is productive of
the sodium salt of methyl 5-(5-hydroxymethylene-2-ethoxy-4-oxo-2-cyclopenten-1-yl)pentanoate,
the sodium salt of methyl 3-methyl-5-(5-hydroxymethylene - 2 - ethoxy - 4 - oxo - 2 - cyclopenten - 1 - yl) pentanoate,
the sodium salt of ethyl3-(5-hydroxymethylene-2-ethoxy-4-oxo-2-cyclopenten-1-yl)propionate, and the like, respectively.

In like manner, substituting other compounds designated (6'), i.e., the position of isomers of the compounds of Formula 6, for ethyl 7-(2-ethoxy-4-oxo - 2 - cyclopenten - 1 - yl)heptanoate is productive of the corresponding compounds designated (7'), i.e., the position isomers of the compounds of Formula 7.

Likewise, the substitution of other metal hydrides, particularly alkali metal hydrides, e.g., potassium hydride, lithium hydride, and the like, for sodium hydride in the above reaction is productive of the corresponding metal salts, e.g., the potassium and lithium salts.

EXAMPLE 5B

Ethyl 7-(5-hydroxymethylene-4-ethoxy-2-oxo-3-cyclopenten-1-yl)heptanoate (7a)

A stirred mixture of 55.0 g. of the sodium salt of ethyl 7 - (5-hydroxymethylene-4-ethoxy-2-oxo-3-cyclopenten-1-yl) heptanoate (7) in 500 ml. of ice water is acidified with about 15 ml. of concentrated hydrochloric acid diluted to 100 ml. with ice. Stirring is continued for about 15 minutes, then the precipitate which has formed is separated by extraction with methylene chloride, washed with water and dried under reduced pressure to yield ethyl 7-(5-hydroxymethylene-4-ethoxy-2-oxo-3-cyclopenten-1-yl)heptanoate (7a).

Similarly substituting other compounds of Formula 7 and compounds designated (7'), i.e., the position isomers of the compounds of Formula 7, for the sodium salt of ethyl 7-(5-hydroxymethylene-4-ethoxy-2-oxo-3-cyclopenten-1-yl)heptanoate is productive of the compounds embraced by Formula (7a) and those designated (7a'), i.e., the position isomers of the compounds of Formula 7a.

EXAMPLE 6

Ethyl 7-[3-ethoxy-5-oxo-2-(3-oxooctylidene)-3-cyclopenten-1-yl heptanoate 9.20 g. of solids comprising the sodium salt of ethyl 7(5-hydroxymethylene - 4-ethoxy-2-oxo-3-cyclopenten-1-yl) heptanoate (7) obtained as in Example 5, was added to a suspension of 15.0 g. of 2-oxoheptyltriphenylphosphonium bromide in 250 ml. of chloroform and heated at reflux under a nitrogen atmosphere for 4 hours. The reaction mixture was then cooled, washed with water and the solvent removed. The residue was taken up in methylene chloride and poured onto a chromatographic column containing 800 g. of Florisil (synthetic magnesium silicate) and the column was developed with commercial hexanes containing increasing amounts of acetone. Those fractions exhibiting major ultraviolet absorption near 272 m$\mu$ (eluted in this instance with 10% acetone-90% commercial hexanes) were, after evaporation of the solvent, combined to yield 2.32 g. of ethyl 7-[3-ethoxy-5-oxo-2-(3-oxooctylidene)-3-cyclopenten-1-yl]heptanoate (8) having the following analysis:

I.R. (principal bands; methylene chloride): 1760, 1720, 1615, 1590 cm.$^{-1}$.

N.M.R.: 53 cps. (triplet); 73, 87 cps. (overlapping triplets); 140 cps. (broad triplet); 172 cps. (broad) 197 cps. (doublet, J=7), 218 cps. (doublet, J=7); 243 cps. (overlapping quartets); 318 cps. (singlet); 371 cps. (triplet, J=7); 409 cps. (triplet).

In like manner substituting the sodium salt of methyl 5-(5-hydroxymethylene-4-ethoxy-2-oxo-3-cyclopenten-1-yl)pentanoate,
the sodium salt of methyl 3-methyl-5-(5-hydroxymethylene-4-ethoxy-2-oxo-3-cyclopenten-1-yl)pentanoate,
the sodium salt of ethyl 3-(5-hydroxymethylene-4-ethoxy-2-oxo-3-cyclopenten-1-yl)propionate, and the like,
for the sodium salt of ethyl 7-(5-hydroxymethylene)-4-ethoxy-2-oxo-3-cyclopenten-1-yl heptanoate is productive of
methyl 5-[3-ethoxy-5-oxo-2-(3-oxooctylidene)-3 - cyclopenten-1-yl]pentanoate,
methyl 3-methyl-5-[3-ethoxy-5-oxo-2-(3-oxooctylidene - 3-cyclopenten-1-yl]pentanoate, and
ethyl 3-[3-ethoxy-5-oxo-2-(3-oxooctylidene)-3 - cyclopenten-1-yl]propionate, and the like, respectively.

Substituting 2-oxopropyltriphenylphosphonium chloride for 2-oxoheptyltriphenylphosphonium bromide is productive of ethyl 7-[3-ethoxy-5-oxo-2-(3-oxobutylidene)-3-cyclopenten-1-yl]heptanoate.

Similarly, substituting the salts, preferably the sodium salt of other compounds of Formula (7) for ethyl 7-(5-hydroxymethylene-4-ethoxy-2-oxo-3-cyclopenten-1 - yl) heptanoate and reacting it with the appropriate triphenylphosphonium chloride, e.g., those named in Preparation 3, is productive of the corresponding compounds embraced by Formula (8) depending on the starting material and the triphenylphosphonium chloride used.

EXAMPLE 6a

Ethyl 7-[5-ethoxy-3-oxo-2-(3-oxooctylidene)-4 - cyclopenten-1-yl]heptanoate (8′)

2.65 g. of solids comprising the sodium salt of ethyl 7-(5-hydroxmethylene-2-ethoxy-4-oxo-2-cyclopenten - 1-yl) heptanoate (7′) was added to a suspension of 4.3 g. of 2-oxoheptyltriphenylphosphonium bromide in 150 ml. of carbon tetrachloride and the mixture was stirred under an atmosphere of nitrogen for 16 hours at 25° C., then for 2 hours at reflux. The reaction mixture was then cooled and filtered and the filtrate was concentrated to produce a residue. The residue was dissolved in 2:1 cyclohexane-ethyl acetate and poured onto chromatographic column containing 400 g. of silica gel and the column was developed with 2:1 cyclohexane-ethyl acetate, the fractions being collected in 200 ml. portions. These portions which exhibited an ultraviolet absorption maximum at 260 m$\mu$ (in this case fractions 12–19) were combined and the solvent removed to afford 1.83 g. of ethyl 7-(5-ethoxy-3-oxo-2-(3-oxooctylidene) - 4 - cyclopenten-1-yl) heptanoate (8′).

I.R. (principal bands; methylene chloride): 1710, 1600, 1580 cm.$^{-1}$.

U.V.: 260 m$\mu$ (shoulder 247 m$\mu$)

N.M.R.: 53 cps. (broad triplet); 198 cps. (doublet, J=7); 245 cps. (overlapping quartets, J=7); 314 cps. (broad singlet); 364 cps. (triplet J=7); 395 cps. (triplet, J=7).

Similarly, substituting other salts, preferably the sodium salt of other compounds designated (7′), i.e., the position isomers of the compounds of Formula 7 for sodium salt of ethyl 7-(5-hydroxymethylene-2-ethoxy-4-oxo-2-cyclopenten-1-yl)heptanoate is productive of the corresponding compounds of Formula 8′, i.e., the position isomers of the compounds of Formula 8.

EXAMPLE 6b

Ethyl 7-[3-ethoxy-5-oxo-2-(3-oxooctylidene)-4 - cyclopenten-1-yl]heptanoate (8)

A mixture of 2.5 g. of ethyl 7-(5-hydroxymethylene-4-ethoxy-2-oxo-3-cyclopenten-1-yl)heptanoate (7a), 5.0 g. of 2-oxoheptylidenetriphenylphosphorane and 150 ml. of carbon tetrachloride is stirred under a nitrogen atmosphere for about 16 hours at 25° C., then for 2 hours at reflux. The reaction mixture is then concentrated to give a residue which is taken up in methylene chloride and poured onto a chromatographic column containing 200 g. of Florisil (synthetic magnesium silicate) and the column is developed with commercial hexanes containing increasing amounts of acetone. Those fractions exhibiting major ultraviolet absorption near 272 m$\mu$ are evaporated to yield ethyl 7-[3-ethoxy-5-oxo-2-(3-oxooctylidene)-4-cyclopenten-1-yl]-heptanoate (8).

In like manner substituting
methyl 5-(5-hydroxymethylene-4-ethoxy-2-oxo-3-cyclopenten-1-yl)pentanoate,
methyl 3-methyl-5-(5-hydroxymethylene-4-ethoxy-2-oxo-3-cyclopenten-1-yl)pentanoate,
ethyl 3-(5-hydroxymethylene-4-ethoxy-2-oxo-3-cyclopenten-1-yl)propionate, and the like, for ethyl 7-(5-hydroxymethylene-4-ethoxy-2-oxo-3-cyclopenten-1-yl)heptanoate is productive of
methyl 5-[3-ethoxy-5-oxo-2-(3-oxooctylidene)-3-cyclopenten-1-yl]pentanoate,
methyl 3-methyl-5-[3-ethoxy-5-oxo-2-(3-oxooctylidene)-3-cyclopenten-1-yl]pentanoate,
ethyl 3-[3-ethoxy-5-oxo-2-(3-oxooctylidene)-3-cyclopenten-1-yl]propionate, and the like, respectively.

In like manner substituting ethyl 7-(5-hydroxymethylene-2-ethoxy-4-oxo-2-cyclopenten-1-yl)heptanoate (7a′) and other compounds designated (7a′) for
ethyl 7-(5-hydroxymethylene-4-ethoxy-2-oxo-3-cyclopenten-1-yl)heptanoate (7a) is productive of
ethyl 7-[5-ethoxy-3-oxo-2-(3-oxooctylidene)-4-cyclopenten-1-yl]heptanoate (8′) and other corresponding compounds designated (8′), respectively.

EXAMPLE 7

Ethyl 7-[3-ethoxy-5-oxo-2$\beta$-(3-oxooctyl)-3 - cyclopenten-1$\alpha$-yl]heptanoate (9)

A solution of 1.257 g. of ethyl 7-[3-ethoxy-5-oxo-2-(3-oxooctylidene)-3-cyclopenten-1-yl]heptanoate (8) in 50 ml. of ethanol was hydrogenated at atmospheric pressure in a hydrogenator in the presence of 0.10 g. of 5% rhodium on carbon catalyst. After the solution had absorbed 34.2 ml. of hydrogen, an additional 0.10 g. of catalyst was added and a further 7 ml. of hydrogen was absorbed. The catalyst was removed by filtration followed by removal of the solvent in vacuo. The thus-obtained residue was taken up in methylene chloride and poured onto a chromatographic column containing 100 g. of Florisil (synthetic magnesium silicate) and the column was developed with commercial hexanes containing increasing amounts of acetone. Those fractions exhibiting major ultraviolet absorption near 240 m$\mu$ (eluted in this instance with 10% acetone – 90% commercial hexanes) were, after evaporation of the solvent, combined to yield 0.929 g. of ethyl 7-[3-ethoxy-5-oxo-2$\beta$-(3-oxooctyl)-3-cyclopenten-1$\alpha$-yl]heptanoate (9) having the following analysis:

I.R. (principal bands; mineral oil mull): 1745, 1700, 1610 cm.$^{-1}$.

N.M.R.: 53 cps. (triplet); 243 cps. (overlapping quartets); 306 cps. (singlet).

In like manner substituting
methyl 5-[3-ethoxy-5-oxo-2-(3-oxooctylidene)-3 - cyclopenten-1-yl]pentanoate,
methyl 3-methyl-5-[3-ethoxy-5-oxo-2-(3-oxooctylidene)-3-cyclopenten-1-yl]pentanoate,
ethyl 3-[3-ethoxy-5-oxo-2-(3-oxooctylidene)-3-cyclopenten-1-yl]propionate,
ethyl 7-[3-ethoxy-5-oxo-2-(3-oxobutylidene)-3-cyclopenten-1-yl]heptanoate, and the like,
for ethyl 7-[3-ethoxy-5-oxo-2-(3-oxooctylidene)-3-cyclopenten-1-yl]heptanoate is productive of
methyl 5-[3-ethoxy-4-oxo-2$\beta$-(3-oxooctyl)-3-cyclopenten-1$\alpha$-yl]pentanoate,
methyl 3-methyl-5-[3-ethoxy-5-oxo-2$\beta$-(3-oxooctyl)-3-cyclopenten-1$\alpha$-yl]pentanoate,
ethyl 3-[3-ethoxy-5-oxo-2$\beta$-(3-oxooctyl)-3-cyclopenten-1$\alpha$-yl]propionate,
ethyl 7-[3-ethoxy-5-oxo-2$\beta$-(3-oxobutyl)-3-cyclopenten-1$\alpha$-yl]heptanoate, and the like, respectively.

Similarly substituting other compounds of Formula 8 for ethyl 7-[3-ethoxy-5-oxo-2-(3-oxooctylidene)-3-cyclopenten-1-yl]heptanoate is productive of the corresponding compounds embraced by Formula 9 depending on the starting material used.

EXAMPLE 7a

Ethyl 7-[3-ethoxy-5-oxo-2$\beta$-(3-oxooctyl)-3-cyclopenten-1$\alpha$-yl]heptanoate (9)

A solution of 10.3 g. of ethyl 7-[3-ethoxy-5-oxo-2-(3-oxooctylidene) - 3-cyclopenten-1-yl]heptanoate (8), 200 ml. of ethanol, and 20 drops of triethylamine was hydrogenated by shaking at a pressure of about 40 p.s.i. in a hydrogenator in the presence of 300 mg. of 5% palladium on charcoal catalyst. After shaking for 17 hours, the theoretical uptake of hydrogen was complete. The reduction was interrupted and the qualitative ultraviolet absorption was measured in ethanol. The presence of an absorption maximum at 239 m$\mu$ and the absence of a peak at 272 m$\mu$ indicated the reaction to be complete. The catalyst was removed by filtration and the filtrate was concentrated to give a residue of 9.83 g.

A total of 12.2 g. of material, prepared as above was dissolved in a minimum volume of 2:1 cyclohexane-ethyl acetate and poured onto a chromatographic column containing 1 kg. of silica gel. The column was eluted with 350 ml. fractions of 2:1 cyclohexane-ethyl acetate. The fractions exhibiting ultraviolet absorption near 260 mμ (in this instance fractions 17 to 24) were combined and evaporated to give 8.1 g. of ethyl 7-[3-ethoxy-5-oxo-2β-(3-oxooctyl) - 3 - cyclopenten-1α-yl]heptanoate (9). The early fractions exhibiting no ultraviolet absorption maxima (in fractions 6–9) were combined and evaporated to give 465 mg. of material exhibiting no ultraviolet absorption above 220 mμ, and which was identified as ethyl 7-[3-ethoxy-5-oxo-2β-(3-oxooctyl)cyclopent-1α-yl]heptanoate, 100 mg. of which was taken up in 0.4 ml. of carbon tetrachloride and placed in an N.M.R. tube. A fine stream of dry hydrogen chloride gas was bubbled through the N.M.R. tube and after about 5 minutes the stream of hydrogen chloride was stopped. The solution contained ethyl 7-[5-oxo-2β - (3 - oxooctyl)-3-cyclopenten-1α-yl]heptanoate which can be isolated by evaporation to dryness. The material so produced can be further purified if desired by chromatography over silica gel in ethyl acetate-cyclohexane 1:10, and combining the fractions exhibiting ultraviolet absorption maxima near 217 mμ and N.M.R. at 454 cps. (quartet); 361 cps. (quartet). Ethyl 7-[5-oxo-2β-(3-oxooctyl)-3-cyclopenten-1α-yl]heptanoate exhibits vasodepressor and lipid mobilizing activity and is useful as an intermediate as described below.

A mixture of 0.325 g. of ethyl 7-[3-ethoxy-5-oxo-2-(3-oxooctyl)cyclopent - 1-yl]heptanoate, 0.30 g. potassium carbonate in 3.0 ml. of water and 15 ml. of ethanol was heated at reflux under a nitrogen atmosphere for 16 hours. The mixture was cooled and the ethanol removed by concentration in vacuo. The residue was diluted with water and extracted with ether and methylene chloride. The aqueous portion was acidified with dilute hydrochloric acid and then extracted with methylene chloride. Evaporation of the methylene chloride solution to dryness yielded 0.270 g. of 4-butylhexahydro-2,5-dioxo-1-indanheptanoic acid having the following analysis:

I.R. (principal bands; methylene chloride): 3200, 2600, 1750 and 1720 cm.$^{-1}$.

N.M.R.: 580 cps. (broad); 141 cps. (broad); 82 cps.; 75 cps.; 53 cps. (distorted triplet).

4-butylhexahydro-2,5-dioxo-1-indanheptanoic acid exhibits vasodepressor and lipid mobilizing activity and is useful in the treatment of hypertension and hyperlipemia in man and other mammals when administered sublingually, intramuscularly, or intravenously in appropriate dosage forms at a dose of .002–0.2 γ/kg.

Similarly, substituting ethyl 7-[5-oxo-2β-(3-oxooctyl)-3-cyclopenten-1α-yl]heptanoate for ethyl 7-[3-ethoxy-5-oxo-2β-(3-oxooctyl)cyclopentan-1α-yl]heptanoate in the potassium carbonate step above is also productive of 4-butylhexahydro-2,5-dioxo-2-indanheptanoic acid.

EXAMPLE 7b

Ethyl 7-[5-ethoxy-3-oxo-2β-(3-oxooctyl)-4-cyclopenten-1α-yl]heptanoate (9')

A solution of 0.450 g. of ethyl 7-[5-ethoxy-3-oxo-2-(3-oxooctylidene)-4-cyclopenten-1-yl]heptanoate (8') in 25 ml. of ethanol was hydrogenated at atmospheric pressure in a hydrogenator in the presence of 0.04 g. of 5% rhodium on alumina catalyst. After 1 hour an additional 0.04 g. of catalyst was added. After the solution had absorbed over 1 equivalent of hydrogen, the catalyst was removed by filtration and the filtrate was evaporated to give a residue. The residue was dissolved in 5:1 cyclohexane-ethyl acetate and poured onto a chromatographic column containing 30 g. of silica gel and the column was developed with 5:1 cyclohexane-ethyl acetate, followed by ethyl acetate. The product exhibiting an ultraviolet absorption maximum near 240 mμ (in this case obtained in the ethyl acetate eluate) was combined with similar material from a similar reduction and, after removal of the solvent, redissolved in methylene chloride and poured onto a chromatographic column containing 5 g. of Florisil (synthetic magnesium silicate). The column was developed with 10% acetone-90% commercial hexanes to give the product with ultraviolet absorption maximum near 240 mμ (in this case fractions 9 through 14) amounting to 0.094 g. of ethyl 7 - [5-ethoxy-3-oxo-2β-(3-oxooctyl)-4-cyclopenten-1α-yl] heptanoate (9').

I.R. (principal bands; methylene chloride): 1735, 1705, 1690, and 1595 cm.$^{-1}$.

N.M.R..: 54 cps. (broad triplet), 74 cps. (triplet), 84 cps. (triplet), 244 cps. (overlapping quartets), 304 cps. (singlet).

Similarly, substituting other compounds designated (8') i.e., the position isomers of the compounds of Formula (8) for ethyl 7-[5-ethoxy-3-oxo-2-(3-oxooctylidene)-4-cyclopenten-1-yl]heptanoate is productive of the corresponding compounds designated (9').

EXAMPLE 8

Ethyl 7 - [3-ethoxy-5-oxo-2β-(3-oxooctyl)-3-cyclopenten-1α-yl]heptanoate (9) and ethyl 7-[5-ethoxy-3-oxo-2β-(3-oxooctyl)-4-cyclopenten-1α-yl]heptanoate (9')

A solution of 1.599 g. of ethyl 7-[3-ethoxy-5-oxo-2β-(3-oxooctyl)-3-cyclopenten-1α-yl]heptanoate (9) and 0.10 g. of p-toluenesulfonic acid in 10 ml. of ethyl alcohol is allowed to stand under an atmosphere of nitrogen at room temperature (20° C.) for 66 hours. The solution is then concentrated at reduced pressure on the steam bath to produce a residue. The residue is dissolved in 1:3 ethyl acetate-cyclohexane and poured onto a chromatographic column containing 250 g. of silica gel. The column is eluted with 1:3 ethyl acetate-cyclohexane, the fractions being taken in 25 ml. portions until all the material exhibiting ultraviolet absorption near 240 mμ has been eluted. Approximately the first liter eluted contains only traces of oil and is discarded. The remaining fractions consist of varying proportions of ethyl 7-[3-ethoxy-5-oxo-2β-(3-oxooctyl)-3-cyclopenten-1α-yl]heptanoate (9) and ethyl 7 - [5-ethoxy-3-oxo-2β-(3-oxooctyl)-4-cyclopenten-1α-yl]heptanoate (9').

If desired, the first third and the last third of the above fractions could be further purified by repeated chromatography to give ethyl 7-[3-ethoxy-5-oxo-2β-(3-oxooctyl)-3 - cyclopenten - 1α - yl]heptanoate (9) and ethyl 7-[5-ethoxy - 3 - oxo - 2β - (3-oxooctyl)-4-cyclopenten-1α-yl] heptanoate (9') in essentially pure form.

Similarly, substituting other compounds of Formula (9) such as methyl 5-[3-ethoxy-5-oxo-2β-(3-oxooctyl)-3-cyclopenten-1α-yl]pentanoate, methyl 3 - methyl - 5-[3-ethoxy-5-oxo-2β-(3-oxooctyl)-3-cyclopenten-1α-yl]pentanoate, ethyl 3-[3-ethoxy-5-oxo-2β-(3-oxooctyl)-3-cyclopenten-1α yl]propionate, ethyl 7 - [3-ethoxy-5-oxo-2β-(3-oxobutyl)-3-cyclopenten-1α-yl]heptanoate, and the like, for ethyl 7-[3-ethoxy-5-oxo-2β-(3-oxooctyl)-3-cyclopenten-1α-yl]heptanoate is productive of methyl 5-[3-ethoxy-5-oxo-2β-(3-oxooctyl)-3-cyclopenten-1α-yl]pentanoate and methyl 5-[5-ethoxy-3-oxo-2β-(3-oxooctyl)-4-cyclopenten-1α-yl]pentanoate, methyl 3 - methyl - 5-[3-ethoxy-5-oxo-2β-(3-oxooctyl)-3-cyclopenten-1α-yl]pentanoate and methyl 3 - methyl - 5-[5-ethoxy-3-oxo-2β-(3-oxooctyl)-4-cyclopenten-1α-yl]penanoate, ethyl 3 - [3-ethoxy-5-oxo-2β-(3-oxooctyl)-3-cyclopenten-1α-yl]propionate and ethyl 3 - [5-ethoxy-3-oxo-2β-(3-oxooctyl)-4-cyclopenten-1α-yl]propionate, ethyl 7 - [3-ethoxy-5-oxo-2β-(3-oxobutyl)-3-cyclopenten-1α-yl]heptanoate and ethyl 7 - [5-ethoxy-3-oxo-2β-(3-oxobutyl)-4-cyclopenten-1α-yl]heptanoate, and the like.

Similarly, substituting the compounds of Formulas 8, 6 and 6a for ethyl 7-[3-ethoxy-5-oxo-2β-(3-oxooctyl)-4-cyclopenten-1α-yl]heptanoate is productive of the corresponding products of Formulas 8 and 8' 6 and 6' and 6a and 6a', respectively, it being understood that in the prime compounds, the substituents at the 3 and 5 positions are reversed, e.g., ethyl 7 - [5 - ethoxy-3-oxo-2β-(3-oxooctylidene) - 4 - cyclopenten-1α-yl]heptanoate (8'), ethyl 7-(2-ethoxy - 4 - oxo-2-cyclopenten-1-yl)heptanoate (6') and ethyl 7-(2-ethoxy-4-oxo-2-cyclopenten-1-ylidene)heptanoate (6').

EXAMPLE 8a

Ethyl 7-[3-benbyloxy-5-oxo-2β-(3-oxooctyl)-3-cyclopenten-1α-yl]heptanoate (9a) and ethyl 7-[5-benzyloxy-3-oxo - 2β - (3-oxooctyl)-4-cyclopenten-1α-yl]heptanoate (9a')

A solution of 1.599 g. of ethyl 7-[3-ethoxy-5-oxo-2β-(3-oxooctyl)-3-cyclopenten-1α-yl]heptanoate (9) and 0.10 g. of p-toluenesulfonic acid in 10 ml. of benzyl alcohol is rotated slowly on a rotating evaporator at 25° C. under vacuum for 66 hours. The solution is then concentrated on the steam bath with an oil pump to produce a residue. The residue is dissolved in 1:3 ethyl acetate-cyclohexane and poured onto a chromatographic column containing 250 g. of silica gel. The column is eluted with 1:3 ethyl acetate-cyclohexane, the fractions being taken in 25 ml. portions until 2.6 liters are collected. Approximately the first liter eluted contains only traces of oil and is discarded. The remaining fractions consisting of varying proportions of ethyl 7 - [3 - benzyloxy-5-oxo-2β-(3-oxooctyl) - 3 - cyclopenten-1α-yl]heptanoate (9a) and ethyl 7 - [5-benzyloxy-3-oxo-2-(3-oxooctyl)-4-cyclopenten-1-yl]heptanoate (9a'), are combined and exhibit N.M.R. bands at 53 cps. (triplet); 73 cps. (triplet); 140 cps.; 243 cps. (quadruplet); 298 cps. (singlet); 302 cps. (singlet), 312 cps. (singlet); 437 cps. (singlet) and 441 cps. (singlet). This material is suitable for use directly in Example 9, Part G.

If desired, the first third and the last third of the above fractions could be further purified by repeated chromatography to give ethyl 7-[3-benzyloxy-5-oxo-2β-(3-oxooctyl)-3-cyclopenten-1α-yl]heptanoate (9a) and ethyl 7-[5 - benzyloxy - 3-oxo-2β-(3-oxooctyl)-4-cyclopenten-1α-yl]heptanoate (9a') in essentially pure form.

Similarly, substituting other compounds of Formula (9) such as methyl 5-[3-ethoxy-5-oxo-2β-(3-oxooctyl)-3-cyclopenten-1α-yl] pentanoate, methyl 3-methyl-5-[3-ethoxy-5-oxo-2β-(3-oxooctyl)-3-cyclopenten-1α-yl]pentanoate, ethyl 3-[3-ethoxy-5-oxo-2β-(3-oxooctyl)-3-cyclopenten-1α-yl]propionate, ethyl 7-[3-ethoxy-5-oxo-2β-(3-oxobutyl)-3-cyclopenten-1α-yl]heptanoate, and the like, for ethyl 7-[3-ethoxy-5-oxo-2β-(3-oxooctyl)-3-cyclopenten-1α-yl]heptanoate is productive of methyl 5-[3-benzyloxy-5-oxo-2β-(3-oxooctyl)-3-cyclopenten-1α-yl]pentanoate and methyl 5-[5-benzyloxy-3-oxo-2β-(3-oxooctyl)-4-cyclopenten-1α-yl]pentanoate, methyl 3-methyl-5-[3-benzyloxy-5-oxo-2β-(3-oxooctyl)-3-cyclopenten-1α-yl]pentanoate and methyl 3-methyl-5-[5-benzyloxy-3-oxo-2β-(3-oxooctyl)-4-cyclopenten-1α-yl]pentanoate, ethyl 3-[3-benzyloxy-5-oxo-2β-(3-oxooctyl)-3-cyclopenten-1α-yl]propionate and ethyl 3-[5-benzyloxy-3-oxo-2β-(3-oxooctyl)-4-cyclopenten-1α-yl]propionate, ethyl 7-[3-benzyloxy-5-oxo-2β-(3-oxobutyl)-3-cyclopenten-1α-yl]heptanoate and ethyl 7-[5-benzyloxy-3-oxo-2β-(3-oxobutyl)-4-cyclopenten-1α-yl]heptanoate, and the like.

EXAMPLE 8b

Benzyl 7-[3-benzyloxy-5-oxo-2β-(3-oxooctyl)-3-cyclopenten-1α-yl]heptanoate (9b) and benzyl 7-[5-benzyloxy-3 - oxo - 2β - (3 - oxooctyl) - 4 - cyclopenten - 1α - yl] heptanoate (9b')

A solution of 1.599 g. of ethyl 7-[3-ethoxy-5-oxo-2β-(3-oxooctyl)-3-cyclopenten-1α-yl]heptanoate (9) and 0.10 g. of p-toluenesulfonic acid in 10 ml. of benzyl alcohol was rotated slowly on a rotatory evaporator at 80° C. under vacuum during 24 hours. The solution was then concentrated and the products thus produced isolated as in Example 8a to produce benzyl 7-[3-benzyloxy-5-oxo-2β-(3 - oxooctyl) - 3-cyclopenten-1α-yl]heptanoate (9b) and benzyl 7-[5-benzyloxy-3-oxo-2β-(3-oxooctyl)-4-cyclopenten-1α-yl]heptanoate (9b').

Similarly, substituting other compounds of Formula (9) for ethyl 7-[3-ethoxy-5-oxo-2β-(3-oxooctyl)-4-cyclopenten-1α-yl]heptanoate there are produced the corresponding products of Formula (9b) and (9b').

EXAMPLE 9

Part A.—Ethyl 7-[3-ethoxy-5-oxo-2β-(3-hydroxyoctyl)-3-cyclopenten-1α-yl]heptanoate (10, $R_7=R_8=$ethyl)

A solution of 0.404 g. of ethyl 7-[3-ethoxy-5-oxo-2β-(3 - oxooctyl) - 3 - cyclopenten - 1α - yl]heptanoate (9, $R_5=$ethyl)

in 20 ml. of tetrahydrofuran was treated with 0.40 g. of lithium tri-t-butoxyaluminum hydride. The reaction mixture was stirred at room temperature (about 20° C.) for 2 hours and cooled to about 5° C. The excess hydride was then decomposed by the dropwise addition of 10% acetic acid. As soon as the bubbling caused by the addition of the acetic acid had stopped, the acidified mixture was made alkaline by the addition of saturated sodium bicarbonate solution. The organic solution was decanted from the inorganic residue, and the latter washed with methylene chloride. The methylene chloride wash was then added to the originally obtained organic solution. The mixed solvent was then removed in vacuo. The residue was then taken up in 1:1 cyclohexane-ethyl acetate and poured onto a chromatographic column containing 20 g. of silica gel and the column was developed with 1:1 cyclohexane-ethyl acetate, the fractions being taken in 25-ml. portions. Those fractions which, after being taken to dryness showed absorption near 3500 cm.$^{-1}$ in the infrared, an ultraviolet maximum in ethanol near 260 mμ and the same thin-layer chromatographic polarity on silica gel plates developed with ethyl acetate and detected with iodine vapor, were combined to yield 0.201 g. of ethyl 7-[3-ethoxy-5-oxo-2β-(3 - hydroxyoctyl)-3-cyclopenten - 1α - yl]heptanoate (10, $R_7=R_8=$ethyl) having the following analysis:

I.R. (principal bands; mineral oil mull) 3530, 3400, 1745, 1720, 1605 cm.$^{-1}$.

N.M.R.: 53 cps. (triplet); 208 cps. (broad); 243 cps. (overlapping quartets); 307 cps. (singlet).

In like manner substituting methyl 5-[3-ethoxy-5-oxo-2β-(3-oxooctyl)-3-cyclopenten-1α-yl]pentanoate, methyl 3-methyl-5-[3-ethoxy-5-oxo-2β-(3-oxooctyl)-3-cyclopenten-1α-yl]pentanoate, ethyl 3-[3-ethoxy-5-oxo-2β-(3-oxooctyl)-3-cyclopenten-1α-yl]propionate, ethyl 7-[3-ethoxy-5-oxo-2β-(3-oxobutyl)-3-cyclopenten-1α-yl]heptanoate, and the like, for ethyl 7-[3-ethoxy-5-oxo-2β-(3-oxooctyl)-3-cyclopenten-1α-yl]heptanoate is productive of methyl 5-[3-ethoxy-5-oxo-2β-(3-hydroxyoctyl)-3-cyclopenten-1α-yl]pentanoate, methyl 3-methyl-5-[3-ethoxy-5-oxo-2β-(3-hydroxyoctyl)-3-cyclopenten-1α-yl]pentanoate,
ethyl 3-[3-ethoxy-5-oxo-2β-(3-hydroxyoctyl)-3-cyclopenten-1α-yl]propionate,
ethyl 7-[3-ethoxy-5-oxo-2β-(3-hydroxybutyl)-3-cyclopenten-1α-yl]heptanoate, and the like, respectively.

Similarly, substituting other compounds of Formula (9, $R_5$=alkyl) for ethyl 7 - [3 - ethoxy - 5 - oxo - 2β - (3-oxooctyl) - 3 - cyclopenten - 1α - yl]heptanoate is productive of the corresponding compounds embraced by Formula (10, $R_7$=$R_8$=alkyl), depending on the starting material used.

Likewise, other reducing agents, e.g., sodium borohydride and potassium borohydride, can be substituted for lithium tri-tert.-butoxyaluminum hydride.

EXAMPLE 9

Part B.—Ethyl 7-[3-benzyloxy-5-oxo-2β - (3 - hydroxyoctyl)-3-cyclopenten-1α-yl]heptanoate (10, $R_7$=benzyl, $R_8$=ethyl)

To a solution of 2.20 g. of ethyl 7-[3-benzyloxy-5-oxo-2β-(3-oxooctyl) - 3 - cyclopenten - 1α - yl]heptanoate (9a, $R_5$=ethyl, $R_6$=benzyl) in 100 ml. of tetrahydrofuran is added 2.7 g. of lithium tri-tert.-butoxyaluminum hydride. The reaction mixture is stirred under an atmosphere of nitrogen at room temperature (about 20° C.) for 3 hours and then cooled to about 5° C. The excess hydride is decomposed by the dropwise addition of 10% acetic acid. The excess acid is promtply neutralized with saturated aqueous sodium bicarbonate. The reaction mixture is extracted twice with ethyl acetate. The ethyl acetate extracts are combined, followed by drying and concentration to yield a residue. The residue is dissolved in methylene chloride and poured onto a chromatographic column containing 150 g. of Florisil (synthetic magnesium silicate) and developed with commercial hexanes containing increasing proportions of acetone. Fractions exhibiting hydroxyl and benzyl absorption in the infrared spectrum and with an ultraviolet maximum near 240 mμ (in this case obtained with 15% acetone in commercial hexanes) are combined and, after removal of the solvent, yielded ethyl 7-[3-benzyloxy-5-oxo-2β-(3-hydroxyoctyl)-3-cyclopenten - 1α - yl]heptanoate (10, $R_7$=benzyl, $R_8$=ethyl).

Similarly, substituting other compounds of Formula (9a, $R_5$=alkyl, $R_6$=benzyl) for ethyl 7-[3-ethoxy-5-oxo-2β-(3-oxooctyl)-3-cyclopenten-1α-yl]heptanoate is productive of the corersponding compounds embraced by Formula (10, $R_7$=benzyl, $R_8$=alkyl).

Likewise, other reducing agents, e.g., sodium borohydride and potassium borohydride, can be substituted for lithium tri-tert.-butoxyaluminum hydride.

EXAMPLE 9

Part C.—Benzyl 7-[3-benzyloxy-5-oxo-2β - (3 - hydroxyoctyl)-3-cyclopenten-1α-yl]heptanoate (10, $R_7$=$R_8$=benzyl)

To a solution of 2.20 g. of benzyl 7-[3-benzyloxy-5-oxo-2-(3-oxooctyl-3-cyclopenten - 1 - yl]heptanoate (9b, $R_6$=benzyl) in 100 ml. of tetrahydrofuran is added 2.7 g. of lithium tri-tert.-butoxyaluminum hydride. The reaction mixture is stirred under an atmosphere of nitrogen at room temperature about 20° C.) for 3 hours and then cooled to about 5° C. The excess hydride is decomposed by the dropwise addition of 10% acetic acid. The excess acid is promptly neutralized with saturated aqueous sodium bicarbonate. The reaction mixture is extracted twice with ethyl acetate. The ethyl acetate extracts are combined, followed by drying and concentration to yield a residue. The residue is dissolved in methylene chloride and poured onto a chromatographic column containing 150 g. of Florisil (synthetic magnesium silicate) and developed with commercial hexanes containing increasing proportions of acetone. Fractions exhibiting hydroxyl and benzyl absorption in the infrared spectrum and with an ultraviolet maximum near 240 mμ (in this case obtained with 15% acetone in commercial hexanes) are combined and, after removal of the solvent, yielded benzyl 7-[3-benzyloxy-5-oxo-2β-(3-hydroxyoctyl)-4-cyclopenten - 1α - yl]heptanoate (10', $R_7$=$R_8$=benzyl).

Similarly, substituting other compounds of Formula (9b, $R_6$=benzyl) for ethyl 7-[3-ethoxy-5-oxo-2β-(3-oxooctyl)-3-cyclopenten-1α-yl]heptanoate is productive of the corresponding compounds embraced by Formula (10, $R_7$=$R_8$=benzyl).

Likewise, other reducing agents, e.g., sodium borohydride and lithium borohydride, can be substituted for lithium tri-tert.-butoxyaluminum hydride.

EXAMPLE 9

Part D.—Ethyl 7-[5-ethoxy-3-oxo-2β-(3-hydroxyoctyl)-4-cyclopenten-1α-yl]heptanoate (10', $R_7$=$R_8$=ethyl)

By substituting ethyl 7-[5-ethoxy-3 - oxo - 2β - (3 - oxooctyl)-)-4-cyclopenten-1α-yl]heptanoate (9', $R_5$=ethyl) for ethyl 7-[3-ethoxy-5-oxo-2β-(3-oxooctyl)-3 - cyclopenten-1α-yl]heptanoate in the procedure of Example 9, Part A, there is obtained ethyl 7-[5-ethoxy-3-oxo-2β-(3-hydroxyoctyl)-4-cyclopenten - 1α - yl]heptanoate (10', $R$=$_7$ $R_8$=ethyl).

Similarly, substituting other compounds of Formula (9', $R_5$=alkyl) for ethyl 7-[3-ethoxy-5-oxo-2β-(3-oxooctyl)-4-cyclopenten-1α-yl]heptanoate in the process of Example 9, Part A, is productive of the corresponding compounds of Formula (10', $R_7$=$R_8$=alkyl).

EXAMPLE 9

Part E.—Ethyl 7-[5-benzyloxy-3-oxo-2β - (3 - hydroxyoctyl)-4-cyclopenten-1α-yl]heptanoate (10', $R_7$=benzyl, $R_8$=ethyl)

By substituting ethyl 7-[5-benzyloxy-3-oxo-2β-(3-oxooctyl)-4-cyclopenten - 1α - yl]heptanoate (9a', $R_5$=ethyl, $R_6$=benzyl) for ethyl 7-[3-benzyloxy-5-oxo-2β-(3-oxooctyl)-3-cyclopenten-1α-yl]heptanoate in the process of Example 9, Part B, there is produced ethyl 7-[5-benzyloxy-3-oxo-2β-(3-hydroxyoctyl)-4 - cyclopenten - 1α - yl]heptanoate, (10', $R_7$=benzyl, $R_8$=ethyl).

Similarly, substituting other compounds of Formula (9a', $R_5$=alkyl, $R_6$=benzyl) for ethyl 7-[3-benzyloxy-5-oxo-2β-(3-oxooctyl)-3-cyclopenten - 1α - yl]heptanoate in the process of Example 9, Part B, is productive of the corresponding compounds embraced by Formula (10', $R_7$=benzyl, $R_8$=alkyl).

EXAMPLE 9

Part F.—Benzyl 7-[5-benzyloxy-3-oxo-2β-(3-hydroxyoctyl)-3-cyclopenten - 1α - yl]heptanoate, (10', $R_7$=$R_8$=benzyl)

By substituting benzyl 7-[5-benzylxy-3-oxo-2β-(3-oxooctyl)-4-cyclopenten-1α-yl]heptanoate (9b', $R_6$=benzyl) for benzyl 7-[3-benzyloxy-5-oxo-2β-(3-oxooctyl)-3-cyclopenten-1α-yl]heptanoate in the process of Example 9, Part C, there is produced benzyl 7-[5-benzyloxy-3-oxo-2β-(3-hydroxyoctyl)-4-cyclopenten-1α-yl]heptanoate (10', $R_7$=$R_8$=benzyl).

Similarly, substituting other compounds of Formula 9b', $R_6$=benzyl) for benzyl 7-[3-benzyloxy-5-oxo-2β - (3-oxooctyl)-3-cyclopenten-1α-yl]heptanoate in the process of Example 9, Part C, is productive of the corresponding compounds embraced by Formula (10', $R_7$=$R_8$=benzyl),

EXAMPLE 9

Part G.—Mixture of ethyl 7-[3-benzyloxy-5-oxo-2β-(3-hydroxyoctyl)-3-cyclopenten-1α-yl]heptanoate (10, $R_7$=benzyl, $R_8$=ethyl) and ethyl 7-[5-benzyloxy-3-oxo-2β-(3-hydroxyoctyl)-4-cyclopenten-1α-yl]heptanoate (10', $R_7$=benzyl, $R_8$=ethyl)

Substituting a mixture of ethyl 7-[3-benzyloxy-5-oxo-2β-(3-oxooctyl)-3-cyclopenten-1α-yl]heptanoate (9a, $R_5$=ethyl, $R_6$=benzyl) and ethyl 7-[5-benzyloxy-3-oxo-2β-(3- oxooctyl)-4-cyclopenten-1α-yl]heptanoate (9a′, $R_5$=ethyl, $R_6$=benzyl), obtained as in Example 8a, and following the procedure of Example 9, Part B, is productive of a mixture of ethyl 7-[3-benzyloxy-5-oxo-2β-(3-hydroxyoctyl)-3-cyclopenten-1α-yl]heptanoate (10, $R_7$=benzyl, $R_8$=ethyl) and ethyl 7-[5-benzyloxy-3-oxo-2β-(3 - hydroxyoctyl) - 4-cyclopenten-1α-yl]heptanoate (10′, $R_7$=benzyl, $R_8$=ethyl).

I.R. (principal bands, methylene chloride): 3550, 3400, 1750, 1705, 1615, 1500 cm.$^{-1}$.

N.M.R.: 50 cps. (triplet); 73 cps. (triplet), 132 cps. (triplet); 208 cps.; 244 cps. (quadruplet), 298, 303, 314, 432 and 436 cps. (singlets).

EXAMPLE 10

Ethyl 7-[3,5-dioxo-2β-(3-hydroxyoctyl)cyclopent-1α-yl]heptanoate (11a)

To a solution containing 0.201 g. of ethyl 7-[3-ethoxy-5-oxo-2β-(3-hydroxyoctyl) - 3 - cyclopenten - 1α - yl]heptanoate (10, $R_7$=$R_8$=ethyl) in 10 ml. of tetrahydrofuran there was added, while maintaining a nitrogen atmosphere, a dilute solution of sulfuric acid (made up by dissolving 12 drops of concentrated sulfuric acid in 10 ml. of water). The reaction mixture was stirred for 16 hours while maintaining the nitrogen atmosphere. Following the removal of the tetrahydrofuran in vacuo, 30 ml. of carbon tetrachloride was added. Saturated sodium bicarbonate solution was added dropwise until a pH of about 5 was obtained. The organic phase was separated and the aqueous phase re-extracted with carbon tetrachloride and the latter carbon tetrachloride phase was combined with the organic phase obtained originally. The combined phases were were washed with water and the solvent was removed in vacuo to yield 0.196 g. of ethyl 7-[3,5-dioxo-2β-(3-hydroxyoctyl)cyclopent - 1α - yl]heptanoate (11a) having the following analysis:

I.R. (principal bands; mineral oil mull): 3400, 2700, 1755, 1710, 1620 cm.$^{-1}$.

The product may be further characterized by the N.M.R. spectrum which shows the loss of the 3-ethoxy "ethyl" bands: N.M.R. 528 cps. (broad); 307 cps. (broad); 247 cps. (quartet, J=7); 214 cps. (broad); 76 cps. (triplet, J=7) and 54 cps. (triplet).

In like manner substituting methyl 5-[3-ethoxy-5-oxo-2β-(3-hydroxyoctyl)-3-cyclopenten-1α-yl]pentanoate,
methyl 3-methyl-5-[3-ethoxy-5-oxo-2β-(3-hydroxyoctyl)-3-cyclopenten-1α-yl]pentanoate,
ethyl 3-[3-ethoxy-5-oxo-2β-(3-hydroxyoctyl)-3-cyclopenten-1α-yl]propionate,
ethyl 7-[3-ethoxy-5-oxo-2β-(3-hydroxybutyl-3-cyclopenten-1α-yl]heptanoate, and the like, for ethyl 7-[3-ethoxy-5-oxo-2β-(3-hydroxyoctyl)-3-cyclopenten-1α-yl]heptanoate is productive of methyl 5-[3,5-dioxo-2β-(3-hydroxyoctyl)cyclopent-1α-yl]pentanoate,
methyl 3-methyl-5-[3,5-dioxo-2β-(3-hydroxyoctyl)cyclopent-1α-yl]pentanoate,
ethyl 3-[3,5-dioxo-2β-(3-hydroxyoctyl)cyclopent-1α-yl]propionate,
ethyl 7-[3,5-dioxo-2β-(3-hydroxybutyl)cyclopent-1α-yl]heptanoate, and the like, respectively.

Similarly substituting other compounds for Formula (10, $R_7$=$R_8$=alkyl) and the compounds of Formula (10′, $R_7$=$R_8$=alkyl), or mixtures thereof, for ethyl 7-[3-ethoxy-5-oxo-2β-(3 - hydroxyoctyl)-3-cyclopenten-1α-yl]heptanoate is productive of the corresponding compounds embraced by Formula 11a.

Likewise other acids, e.g., perchloric, hydrochloric, hydrobromic, p-toluenesulfonic and trifluoroacetic acid can be substituted for sulfuric acid to convert the compounds of Formulas (10, $R_7$=$R_8$=alkyl) and (10′, $R_7$=$R_8$=alkyl) or mixtures thereof, to the compounds of Formula 11a.

EXAMPLE 11

Ethyl 7-[3,5-dioxo-2β-(3-hydroxyoctyl)cyclopent-1α-yl]heptanoate (11a)

A solution of 0.698 g. of ethyl 7-[3-benzyloxy-5-oxo-2β-(3-hydroxyoctyl)-3-cyclopenten-1α-yl]heptanoate (10, $R_7$=benzyl, $R_8$=ethyl) in 50 ml. of ethanol is hydrogenated in the presence of 0.1 g. of 5% palladium on charcoal catalyst at atmospheric pressure in a hydrogenator at about 20° C. until one equivalent of hydrogen is absorbed. The catalyst is then removed by filtration and the solvent is removed to give a residue of ethyl 7-[3,5-dioxo - 2β - (3-hydroxyoctyl)cyclopent-1α-yl]heptanoate (11a).

Similarly substituting other compounds of Formula (10, $R_7$=benzyl, $R_8$=alkyl) and the compounds of Formula (10′, $R_7$=benzyl, $R_8$=alkyl), or mixtures thereof, for ethyl 7 - [3 - benzyloxy-5-oxo-2β-(3-hydroxyoctyl)-3-cyclopenten-1α-yl]heptanoate is productive of the corresponding compounds embraced by Formula 11a.

EXAMPLE 12

7-[3,5-dioxo-2β-(3-hydroxyoctyl)cyclopent-1α-yl] heptanoic acid (11b)

Substituting benzyl 7 - [3 - benzyloxy-5-oxo-2β-(3-hydroxyoctyl) - 3 - cyclopenten - 1α - yl]heptanoate (10, $R_7$=$R_8$=benzyl) for ethyl 7-[3-benzyloxy-5-oxo-2β-hydroxyoctyl) - 3 - cyclopenten-1α,yl]heptanoate in the procedure of Example 11 and permitting at least two equivalents of hydrogen to be absorbed there is obtained 7-[3,5-dioxo-2β-(3-hydroxyoctyl)cyclopent-1α-yl]heptanoic acid (11b).

Similarly the substitution of other compounds of Formula (10, $R_7$=$R_8$=benzyl) and the compounds of Formula (10′, $R_7$=$R_8$=benzyl), or mixtures thereof, in the procedure of Example 12 is productive of the corresponding compounds embraced by Formula 11b.

EXAMPLE 13

Ethyl 7-[3-hydroxy-5-oxo-2β-(3-hydroxyoctyl)cyclopent-1α-yl]heptanoate (dihydro-PGE ethyl ester) (12a) and ethyl 7 - [5 - hydroxy-3-oxo-2β-(3-hydroxyoctyl)-cyclopent-1α-yl]heptanoate (12a′)

A mixture containing 0.065 g. of ethyl 7-[3,5-dioxo-2β-(3 - hydroxyoctyl)cyclopent-1α-yl]heptanoate (11a), 0.5 g. of potassium acetate and 0.10 g. of 5% rhodium on alumina catalyst in 25 ml. of ethanol was hydrogenated at atmospheric pressure in a hydrogenator. Over a period of 25 minutes a total of 5.6 ml. of hydrogen was absorbed. The hydrogenation was stopped, the reaction mixture was filtered and the solvent was removed in vacuo. The residue was leached with carbon tetrachloride and the solvent was removed to yield 0.053 g. of a viscous oil which was redissolved in methylene chloride and washed with water. The methylene chloride was then removed in vacuo to yield 0.043 g. of product as a mixture of ethyl 7-[3-hydroxy - 5 - oxo-2β-(3-hydroxyoctyl)cyclopent-1α-yl]heptanoate (12a) and ethyl 7-[5-hydroxy-3-oxo-2β-(3-hydroxyoctyl)cyclopent-1α-yl]heptanoate (12a′) having the following analysis:

I.R. (principal bands; methylene chloride): 3600, 3425, 1760 cm.$^{-1}$.

The 0.043 g. of product is then taken up in 0.5 ml. of 1:1 cyclohexane-ethyl acetate and poured onto a chromatographic column containing 4 g. of silica gel. The column is eluted with 1:1 cyclohexane-ethyl acetate, collecting 2 ml. fractions. Those fractions which, after evaporation of the solvent, show the presence of ethyl 7-[3α-hydroxy-5-oxo-2β-(3-hydroxyoctyl)cyclopent-1α-yl]heptanoate, as determined by infrared analysis, ultraviolet analysis in the presence of base, and thin layer chromatography are combined, and have the following analysis:

Mass spectrum: m/e 384, 366, 348, 295, 249, 210, 192.

N.M.R.: 53 cps. (broad triplet); 75 cps. (triplet, J=7); 95 cps. (shoulder); 133 cps. (distorted triplet); 214 cps. (broad); 233 cps. (exchangeable proton); 244 cps. (quartet, J=7).

I.R. (principal bands, carbon tetrachloride): 3300, 1740 cm.$^{-1}$.

Muscle strip activity: 10–20% of $PGE_1$ on rabbit jejunum; 10–25% $PGE_1$ on guinea pig ileum.

Those fractions which, after evaporation of the solvent, show the presence of ethyl 7-[3β-hydroxy-5-oxo-2β-(3-hydroxyoctyl)cyclopent-1α-yl]heptanoate, as determined by infrared analysis, ultraviolet analysis in the presence of base, and thin layer chromatography are combined; those fractions which show the presence of ethyl 7-[5α-hydroxy-3-oxo-2β - (3-hydroxyoctyl)cyclopent-1α-yl]heptanoate, as determined similarly by infrared, ultraviolet and thin layer chromatographic analyses are combined; those fractions which show the presence of ethyl 7-[5β-hydroxy-3-oxo-2β - (3-hydroxyoctyl)cyclopent-1α-yl]heptanoate, as determined similarly by infrared, ultraviolet and thin layer chromatographic analyses are combined thus yielding these compounds as separated entities.

If desired, other means of purification useful in separating closely related lipids, fatty acids and fatty esters, such as reverse phase partition chromatography, countercurrent distribution, adsorption, chromatography, on acid washed Florisil and acid washed silica gel, preparative paper chromatography, preparative thin layer chromatography and combinations thereof can be used equally effectively to separate the compounds of Formulas 12a and 12a′.

In like manner substituting methyl 5-[3,5-dioxo-2β-(3-hydroxyoctyl)cyclopent-1α-yl] pentanoate, methyl 3-methyl-5-[3,5-dioxo-2β-(3-hydroxyoctyl) cyclopent-1α-yl]pentanoate, ethyl 3-[3,5-dioxo-2β-(3-hydroxyoctyl)cyclopent-1α-yl] propionate, ethyl 7-[3,5-dioxo-2β-(3-hydroxybutyl)cyclopent-1α-yl] heptanoate, and the like, for ethyl 7-[3,5-dioxo-2β-(3-hydroxyactyl)cyclopent-1α-yl]heptanoate, is poductive of methyl 5-[3-hydroxy-5-oxo-2β-(3-hydroxyoctyl)cyclopent-1α-yl]pentanoate and methyl 5-[5-hydroxy-3-oxo-2β-(3-hydroxyoctyl)cyclopent-1α-yl]pentanoate, methyl 3-methyl-5-[3-hydroxy-5-oxo-2β-(3-hydroxyoctyl) cyclopent-1α-yl]pentanoate and methyl 3-methyl-5-[5-hydroxy-3-oxo-2β-(3-hydroxyoctyl)cyclopent-1α-yl] pentanoate, ethyl 3-[3-hydroxy-5-oxo-2β-(3-hydroxyoctyl)cyclopent-1α-yl] propionate, and ethyl 3-[5-hydroxy-3-oxo-2β-(3-hydroxyoctyl)cyclopent-1α-yl[propionate, ethyl 7-[3-hydroxy-5-oxo-2β-(3-hydroxybutyl)cyclopent-1α-yl]heptanoate, ethyl 7-[5-hydroxy-3-oxo-2β-(3-hydroxybutyl)cyclopent-1α-yl]heptanoate, and the like, respectively.

Similarly substituting other compounds of Formula 11a for ethyl 7-[3,5-dioxo-2β-(3-hydroxyoctyl)cyclopent-1α-yl]heptanoate is productive of the corresponding compounds embraced by Formulas 12a and 12a′.

Each of the compounds of Formulas 12a and 12a′, produced by the hydrogenation of each of the compounds of Formula 11a can be separated by the procedures described above for the separation of ethyl 7-[3-hydroxy-5-oxo-2β-(3-hydroxyoctyl)-cyclopent-1α-yl]heptanoate 12a from ethyl 7-[5-hydroxy-3-oxo-2β-(3-hydroxyoctyl)cyclopent-1α-yl]heptanoate 12a′.

EXAMPLE 13a

7-[3-hydroxy-5-oxo-2β-(3-hydroxyoctyl)cyclopent - 1α-yl]heptanoic acid (dihydro-$PGE_1$) (12b) and 7-[5-hydroxy-3-oxo-2β-(3-hydroxyoctyl)cyclopent - 1α - yl] heptanoic acid 12b′.

Following the procedure of Example 13 but substituting 7-[3,5-dioxo-2β-(3-hydroxyoctyl)cyclopent - 1α - yl] heptanoic acid 11b for ethyl 7-[3,5-dioxo-2β-(3-hydroxyoctyl)cyclopent-1α-yl]heptanoate 11a is productive of 7-[3-hydroxy-5-oxo-2β-(3-hydroxyoctyl)cyclopent - 1α - yl] heptanoic acid 12b and 7-[5-hydroxy-3-oxo-2β-(3-hydroxyoctyl)cyclopent-1α-yl]heptanoic acid 12b′.

Similarly, substituting other compounds of Formula 11b for ethyl 7-[3,5-dioxo-2β-(3-hydroxyoctyl)cyclopent-1α-yl]heptanoate is productive of the corresponding compounds embraced by Formulas 12b and 12b′.

EXAMPLE 14

Ethyl 7-[3α-acetoxy-5-oxo-2β-(3-acetoxyoctyl) cyclopent-1α-yl]heptanoate 13

A reaction mixture of 0.2 g. of ethyl 7-[3α-hydroxy-5-oxo - 2β - (3-hydroxyoctyl)cyclopent-1α-yl]heptanoate 12a, 1.0 ml. of acetic anhydride and 1.0 ml. of pyridine is allowed to stand at room temperature for about 18 hours, then is diluted with 50 ml. of ether. The ether solution is washed twice with water, then with aqueous sodium bicarbonate, dried over sodium sulfate, and evaporated to yield ethyl 7-[3α-acetoxy-5-oxo-2β-(3-acetoxyoctyl)cyclopent-1α-yl]heptanoate 13.

Similarly, substituting other acyl anhydrides such as propionic anhydride, butyric anhydride, acrylic anhydride, crotonic anhydride, cyclohexanecarboxylic anhydride, benzoic anhydride, naphthoic anhydride, p-chlorophenoxyacetic anhydride, furoic anhydride, lauric anhydride, phenylacetic anhydride, and the like, or acyl chlorides, for acetic anhydride, the corresponding ethyl 7-[3α-acyloxy-5-oxo-2β - (3-acyloxyoctyl)cyclopent-1α-yl]heptanoates 13 are obtained.

Similarly substituting other compounds of Formula 12a and the compounds of Formula 12b for ethyl 7-[3α-hydroxy5-oxo-2β(3-hydroxyoctyl)cyclopent-1α - yl]heptanoate, and reacting it with the appropriate acyl anhydride or acyl chloride is productive of the compounds embraced by Formula 13.

EXAMPLE 14a

Ethyl 7-[5-acetoxy-3-oxo-2β-(3-acetoxyoctyl) cyclopent-1α-yl]heptanoate 13′

Substituting ethyl 7-[5-hydroxy-3-oxo-2β-(3-hydroxyoctyl)cyclopent-1α-yl]heptanoate 12a′ for ethyl 7-[3-hydroxy-5-oxo-2β - (3-hydroxyoctyl)cyclopent-1α-yl]heptanoate and following the procedure of Example 14 is productive of ethyl 7-[5-acetoxy-3-oxo-2β-(3-acetoxyoctyl) cyclopent-1α-yl]hepanoate 13′.

Similarly substituting other acyl anhydrides or acyl chlorides, e.g., those listed in Example 14, for acetic anhydride is productive of the corresponding ethyl 7-[5-acyloxy-3-oxo-2β - (3-acyloxyoctyl)cyclopent-1α-yl]heptanoate 13′.

Likewise, substituting other compounds of Formula 12a′ and the compounds of Formula 12b′ for ethyl 7-[3-hydroxy-5-oxo-2β - (3-hydroxyoctyl)cyclopent-1α-yl]heptanoate is productive of the compounds embraced by Formula 13′.

In like manner the compounds of Formulas 10 and 10′ can also be acylated to obtain the corresponding acylates thereof.

EXAMPLE 15

Methyl 7-[3-hydroxy-5-oxo-2β-(3-hydroxyoctyl) cyclopent-1α-yl]heptanoate (12a)

A solution of 0.2 g. of 7-[3-hydroxy-5-oxo-2β-(3-hydroxyoctyl)cyclopent-1α-yl]heptanoic acid (12b) in a mixture of 1 ml. of methanol and 9 ml. of diethyl ether is mixed at room temperature with excess diazomethane in diethyl ether and allowed to stand for about 15 minutes. The mixture is then evaporated to dryness under diminished pressure to obtain a residue comprising methyl 7-[3-hydroxy-5-oxo-2β-(3 - hydroxyoctyl)cyclopent-1α-yl]heptanoate (12a). The thus obtained methyl ester is purified by chromatography over silica gel, eluting with 1:1 ethyl acetate-cyclohexane. The eluate fractions are evaporated and the residues which show the proper infrared analysis and mobility on thin-layer chromatography are combined to yield purified methyl 7-[3-hydroxy-5-oxo-2β - (3 - hydroxyoctyl)cyclopent-1α-yl]heptanoate (12a).

In like manner substituting for diazomethane other diazoalkanes, for example diazoethane, diazobutane, 1-diazo - 2 - ethylhexane, cyclohexyldiazomethane, diazododecane, and the like gives ethyl, butyl, 2-ethylhexyl, cyclohexylmethyl, allyl, lauryl, and the like esters of 7-[3-hydroxy-5-oxo-2β - (3 - hydroxyoctyl)cyclopent - 1α-yl]heptanoic acid, respectively.

Similarly substituting other compounds of Formula 12b the compounds of Formula 12b' and the compounds of Formulas 13 and 13', wherein $R_3$ is hydrogen, for 7-[3-hydroxy-5-oxo-2β - (3 - hydroxyoctyl)cyclopent - 1α-yl]heptanoic acid, and reacting it with the appropriate diazo compound is productive of the corresponding other compounds of Formula 12a, the compounds of formula 12a' and the compounds of Formulas 13 and 13', wherein $R_3$=alkyl, depending on the starting material and particular diazo compound used.

EXAMPLE 16

7-[3-hydroxy-5-oxo-2β-(3-hydroxyoctyl)cyclopent-1α-yl]heptanoic acid (12b) as its sodium salt 2 mg. of 7-[3-hydroxy-5-oxo-2β - (3 - hydroxyoctyl)cyclopent-1α-yl]heptanoic acid (12b) is dissolved in 3 ml. of 1:1 water-ethanol. The solution is cooled to about 10° C. and neutralized with an equivalent amount of 0.01 N aqueous sodium hydroxide solution. Freeze-drying yields 7-[3-hydroxy-5-oxo-2β-(3-hydroxyoctyl)cyclopent-1α-yl]heptanoic acid as its sodium salt.

Likewise substituting other compounds of Formula 12b, the compounds of Formulas 12b' and 11b, and the compounds of Formulas 13 and 13', wherein $R_3$ is hydrogen, for 7-[3-hydroxy-5-oxo-2β - (3 - hydroxyoctyl)cyclopent-1α-yl]heptanoic acid is productive of the corresponding other compounds embraced by Formula 12b, the compounds of Formulas 12b' and 11b and the compounds of Formulas 13 and 13', wherein $R_3$ is hydrogen, as their sodium salts.

Similarly, potassium hydroxide, calcium hydroxide, tetramethylammonium hydroxide, benzylammonium hydroxide, sodium bicarbonate, potassium carbonate and the like can be substituted for sodium hydroxide.

EXAMPLE 17

Ethyl 7-[3-hydroxy-5-oxo-2β-(3-hydroxyoctyl)cyclopent-1α-yl]heptanoate (dihydro PGE$_1$ ethyl ester) (12a) and ethyl 7-[5-hydroxy-3-oxo-2β - (3 - hydroxyoctyl)cyclopent-1α-yl]hepanoate (12a')

A solution of 0.698 g. of ethyl 7-[3-benzyloxy-5-oxo-2β-(3-hydroxyoctyl)-3-cyclopenten - 1α - yl]heptanoate (10, $R_7$=benzyl, $R_8$=ethyl) in 50 ml. of ethanol is hydrogenated in the presence of 0.1 g. of 5% palladium on charcoal at atmospheric pressure in a hydrogenator at about 20° C. until one equivalent of hydrogen is absorbed, thus yielding ethyl 7-[3,5-dioxo-2β-(3-hydroxyoctyl)cyclopent-1α-yl]heptanoate (11a). To this hydrogenation mixture comprising (11a) there is then added 0.1 g. of potassium acetate, 2.0 ml. of acetic and 0.1 g. of 30% rhodium on carbon catalyst. Hydrogenation is then continued at atmospheric pressure and at about 20° C. until about 1.2 equivalents of hydrogen is additionally absorbed. The catalyst is then removed by filtration and the reaction mixture is concentrated to a small volume. Fifty ml. of methylene chloride is added and the methylene chloride solution is washed with aqueous potassium carbonate solution, dried, and evaporated to give an oily residue of about 0.35 g. which contains 8 components by thin-layer chromatography on a silica plate developed with ethyl acetate. The residue is dissolved in 1:1 cyclohexane-ethyl acetate and poured onto a chromatographic column containing 40 g. of silica gel. The column is developed with 1:1 cyclohexane-ethylacetate, collecting 15 ml. fractions. Each fraction is analyzed by thin-layer chromatography on silica gel plates developed with ethyl acetate and sprayed with sulfuric acid to detect the spots. Each fraction is also analyzed by evaporating an aliquot to dryness, redissolving in 0.2 ml. of 0.01 N ethanolic potassium hydroxide, warming to near reflux for about 1 hour and determining whether an ultraviolet absorption maximum is present near 237 mμ and which have essentially the same mobility on thin-layer chromatographic analysis as ethyl 7-[3-hydroxy-5-oxo-2β-(3-hydroxyoctyl)cyclopenten-1α - yl]heptanoate (prepared by catalytic reduction of PGE$_1$ ethyl ester) are combined and, after removal of the solvent, yielded about 0.09 g. of ethyl 7-[3-hydroxy-5-oxo-2β - (3 - hydroxyoctyl)cyclopent - 1α - yl]heptanoate (12a). Those fractions which develop ultraviolet absorption at about 237 Mμ but exhibit a mobility on thin-layer chromatography similar to but distinctly different from ethyl 7-[3-hydroxy-5-oxo-2β-(3-hydroxyoctyl)cyclopenten - 1α - yl] heptanoate are combined and, after removal of the solvent yielded ethyl 7-[5-hydroxy-3-oxo-2β - (3 - hydroxyoctyl)cyclopent-1α-yl]heptanoate (12a').

If desired, purification may alternatively be affected by the methods named in Example 13.

In like manner, substituting methyl 5-[3-benzyloxy-5-oxo-2β-(3-hydroxyoctyl)-3-cyclopenten-1α-yl]pentanoate, methyl 3-methyl-5-[3-benzyloxy-5-oxo-2β-(3-hydroxyoctyl)-3-cyclopenten-1α-yl]pentanoate, ethyl 3-[3-ethoxy-5-oxo-2β-(3-hydroxyoctyl)-3-cyclopenten-1-yl]propionate, methyl 7-[3-benzyloxy-5-oxo-2β-(3-hydroxybutyl)-3-cyclopenten-1α-yl]heptanoate, ethyl 7-[5-benzyloxy-3-oxo-2β-(3-hydroxyoctyl)-4-cyclopenten-1α-yl]heptanoate, ethyl 7-[3-benzyloxy-5-oxo-2β-(3-hydroxybutyl)-3-cyclopenten-1α-yl]heptanoate, and the like for ethyl 7-[3-benzyloxy-5-oxo-2β-(3-hydroxyoctyl)-3-cyclopenten-1α-yl]heptanoate is productive of methyl 5-[3-hydroxy-5-oxo-2β-(3-hydroxyoctyl)cyclopenten-1α-yl]pentanoate and methyl 5-[5-hydroxy-3-oxo-2β-(3-hydroxyoctyl)cyclopent-1α-yl]pentanoate, methyl 3-methyl-5-[3-hydroxy-5-oxo-2β-(3-hydroxyoctyl)cyclopent-1α-yl]pentanoate and methyl 3-methyl-5-[5-hydroxy-3-oxo-2β-(3-hydroxyoctyl)cyclopent-1α-yl]pentanoate, ethyl 3-[3-hydroxy-5-oxo-2β-(3-hydroxyoctyl)cyclopent-1α-yl]propionate and ethyl 3-[5-hydroxy-3-oxo-2β-(3-hydroxyoctyl)cyclopent-1α-yl]propionate, methyl 7-[3-hydroxy-5-oxo-2β-(3-hydroxybutyl)cyclopent-1α-yl]heptanoate and methyl 7-[5-hydroxy-3-oxo-2β-(3-hydroxybutyl)cyclopent-1α-yl]heptanoate ethyl 7-[3-hydroxy-5-oxo-2β-(3-hydroxyoctyl)cyclopent-1α-yl]heptanoate and ethyl 7-[5-hydroxy-3-oxo-2β-(3-hydroxyoctyl)cyclopent-1α-yl]heptanoate, ethyl 7-[3-hydroxy-5-oxo-2β-(3-hydroxybutyl)cyclopent-1α-yl]heptanoate and ethyl 7-[5-hydroxy-3-oxo-2β-(3-hydroxybutyl)cyclopent-1α-yl]heptanoate, and the like.

Similarly substituting other compounds of Formulas 10 and 10', wherein $R_7$=benzyl, $R_8$=alkyl, and following the procedure of Example 17 is productive of the compounds of Formulas 12a and 12a'.

EXAMPLE 18

7-[3-hydroxy - 5 - oxo-2β-(3-hydroxyoctyl)cyclopent-1α-yl]heptanoic acid (dihydro-PGE$_1$) (12b) and 7-[5-hydroxy - 3 - oxo - 2β - (3-hydroxyoctyl)cyclopent-1α-yl]heptanoic acid (12b')

Substituting benzyl 7-[3-benzyloxy-5-oxo-2-(3-hydroxyoctyl)-3-cyclopenten-1-yl]heptanoate (10, R₇=R₈=benzyl) in the procedure of Example 17 and permitting about two equivalents of hydrogen to be absorbed during the hydrogenation with palladium on charcoal catalyst is productive of 7-[3-hydroxy-5-oxo-2β-(3-hydroxyoctyl)cyclopent-1α-yl]heptanoic acid (dihydro-PGE₁) (12b) and 7-[5-hydroxy-3-oxo-2β-(3 - hydroxyoctyl)cyclopent-1α-yl] heptanoic acid (12b').

Similarly, substituting other compounds of Formula 10 and the compounds of Formula 10', wherein R₇=R₈=benzyl and following the procedure of Example 18, is productive of the compounds of Formulas 12b and 12b'.

EXAMPLE 19

Ethyl 3-(2-oxocyclopent-1-ylidene)propionate

To a solution of 2.4 g. of 2-hydroxymethylencyclopentanone in 35 ml. of methylene chloride was added 7.0 g. of carbethoxymethylenetriphenylphosphorane, while stirring under nitrogen at 20° C. After 16 hours, the solution was concentrated in vacuo to give an oily residue. The residue was triturated at room temperature with three 100 ml. portions of commercial hexanes and filtered. The filtrate was evaporated to give a residue (5.1 g.) which was dissolved in methylene chloride and poured onto a chromatographic column containing 200 g. of Florisil and eluted with 5% acetone-commercial hexanes, collecting 200 ml. portions. Fractions 3–18 were combined and evaporated to yield 2.25 g. of ethyl 3-(2-oxocyclopent-1-ylidene)propionate having the following analysis:

I.R. (principal bands; methylene chloride solution): 1750 and 1665 cm⁻¹.

N.M.R.: 73 cps. (triplet, J=7); 191 cps. (doublet of triplets, J=7,2); 248 cps. (quadruplet, J=7).

Alternatively, substituting an equivalent amount of the sodium salt of 2-hydroxymethylenecyclopentanone and an equivalent amount of carbethoxymethyltriphenylphosphonium chloride for 2-hydroxymethylenecyclopentanone and carbethoxymethyltriphenylphosphorane respectively, in the above process is also productive of ethyl 3-(2-oxocyclopent-1-ylidene)propionate.

EXAMPLE 20

Ethyl 3(2-oxocyclohex-1-ylidene)propionate

To a solution of 2.5 g. of 2-hydroxymethylenecyclohexanone in 30 ml. of methylene chloride was added 7.0 g. of carbethoxymethylenetriphenylphosphorane with stirring at 20° C. After 16 hours, the solution was concentrated in vacuo to yield a crystalline residue. The residue was triturated with two 100 ml. portions of commercial hexanes and filtered. The filtrate was concentrated to yield 4.5 g. of oily residue. The residue was dissolved in 50 ml. of 1:5 acetone-commercial hexanes and poured onto a short chromatographic column containing 50 g. of Florisil. Elution of the column with 1 liter of 1:5 acetone-commercial hexanes yielded 2.17 g. of ethyl 3-(2-oxocyclohex-1-ylidene)propionate as a colorless oil after removal of the solvent having the following analysis:

N.M.R.: 74 cps. (triplet, J=7); 184 cps. (doublet of triplets, J=1.5,7); 247 cps. (quadruplet, J=7); and 396 cps. (triplet of triplets, J=1.5,7).

Alternatively, substituting on equivalent amount of the sodium salt of 2-hydroxymethylenecyclohexanone and an equivalent amount of carbethoxymethyltriphenylphosphorium chloride for 2-hydroxymethylenecyclohexane and carboxymethylenetriphneylphosphorane respectively, in the above procedure is also productive of ethyl 3-(2-oxocyclohex-1-ylidene)propionate.

We claim:
1. A compound selected from those of the formula

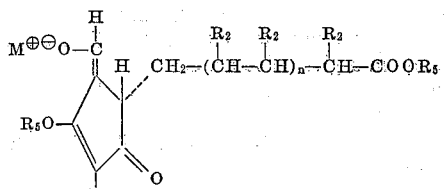

(7)

and

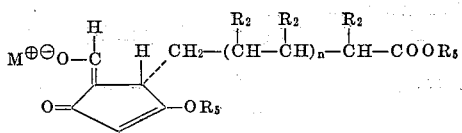

(7')

and

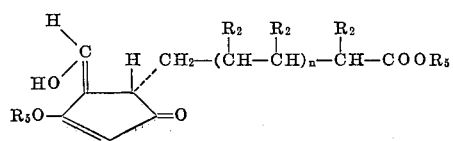

(7a)

and

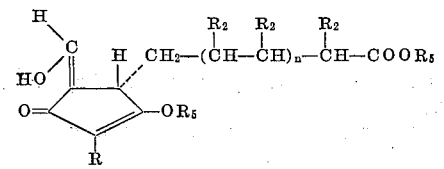

(7a')

wherein

R is selected from the group consisting of hydrogen and methyl,

R₂ is selected from the group consisting of hydrogen and methyl, with the proviso that not more than one R₂ can be methyl in a given side chain, R₅ is an alkyl radical containing 1 to 12 carbon atoms, inclusive, n is an integer selected from the group consisting of 0, 1, and 2, and M is an alkali metal, and the enantiomers and racemic mixtures thereof.

2. Sodium salt of racemic ethyl 7-(5-hydroxymethylene - 4 - ethoxy-2-oxo-3-cyclopenten-1-yl)heptanoate, a compound according to Formula 7 of claim 1 wherein R and R₂ are hydrogen, R₅ is ethyl, n is 2 and M is sodium.

3. Racemic ethyl 7-[5-hydroxymethylene-4-ethoxy-2-oxo-3-cyclopenten-1-yl)heptanoate, a compound according to Formula 7a of claim 1 wherein R and R₂ are hydrogen, R₅ is ethyl and n is 2.

4. A compound selected from those of the formulas

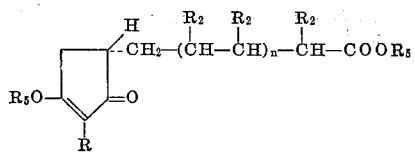

(6)

and

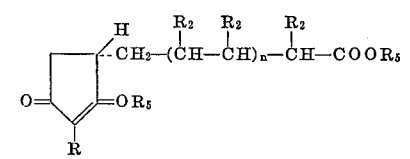

(6')

wherein

R is selected from the group consisting of hydrogen and methyl, $R_2$ is selected from the group consisting of hydrogen and methyl, with the proviso that not more than one $R_2$ can be methyl in a given side chain, $R_5$ is an alkyl radical containing 1 to 12 carbon atoms, inclusive, and $n$ is an integer selected from the group consisting of 0, 1, and 2, and the enantiomers and racemic mixtures thereof.

5. Racemic ethyl 7-[4-ethoxy-2-oxo-3-cyclopenten-1-yl)heptanoate, a compound according to Formula 6 of claim 4 wherein R and $R_2$ are hydrogen, $R_5$ is ethyl and $n$ is 2.

6. A compound selected from those of the formulas

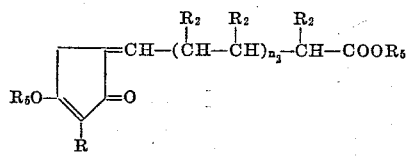

(6a)

and

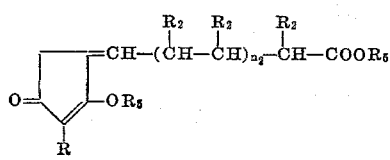

(6a′)

wherein

R is selected from the group consisting of hydrogen and methyl, $R_2$ is selected from the group consisting of hydrogen and methyl, with the proviso that not more than one $R_2$ can be methyl in a given side chain, $R_5$ is an alkyl radical containing 1 to 12 carbon atoms, inclusive, and $n_2$ is an integer selected from the group consisting of 1 and 2.

7. Ethyl 7-(4-ethoy-2-oxo-3-cyclopenten-1-ylidene)heptanoate, a compound according to Formula 6a of claim 6 wherein R and $R_2$ are hydrogen, $R_5$ is ethyl and $n_2$ is 2.

8. A compound of the formula

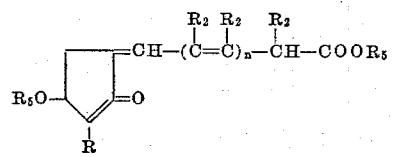

(5)

wherein

R is selected from the group consisting of hydrogen and methyl, $R_2$ is selected from the group consisting of hydrogen and methyl, with the proviso that not more than one $R_2$ can be methyl in a given side chain, $R_5$ is an alkyl radical containing 1 to 12 carbon atoms, inclusive, and $n$ is an integer selected from the group consisting of 0, 1, and 2.

9. Ethyl 7-(4-ethoxy-2-oxo-3-cyclopen-1-ylidene)-3,5-heptadienoate, a compound according to claim 8 wherein R and $R_2$ are hydrogen, $R_5$ is ethyl and $n$ is 2.

10. Process for the production of compounds of the formula

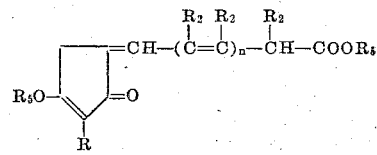

(5)

wherein

R is selected from the group consisting of hydrogen and methyl, $R_2$ is selected from the group consisting of hydrogen and methyl, with the proviso that not more than one $R_2$ can be methyl in a given side chain, $R_5$ is an alkyl radical containing 1 to 12 carbon atoms, inclusive, and $n$ is an integer selected from the group consisting of 0, 1 and 2.

which comprises treating a compound of the formula

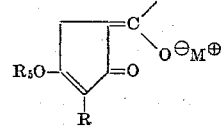

(4)

wherein M is an alkali metal and R and $R_5$ are defined as above, with a compound of the formula

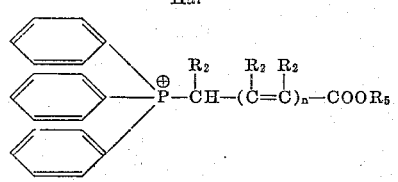

(14)

wherein Hal is selected from the group consisting of bromine and chlorine, and $R_2$, $R_5$ and $n$ are defined as above.

11. Process according to claim 10 wherein R and $R_2$ are hydrogen, $R_5$ is ethyl and $n$ is 2, giving ethyl 7-(4-ethoxy-2-oxo-3-cyclopenten-1-ylidene)-3,5-heptadienoate as product.

References Cited

UNITED STATES PATENTS 3,432,541   3/1969   Bagli et al. _____ 260—468

LORRAINE A. WEINBERGER, Primary Examiner

P. J. KILLOS, Assistant Examiner

U.S. Cl. X.R.

260—473, 501.1, 501.15, 514, 586, 590, 999